United States Patent
Haldeman et al.

(10) Patent No.: US 11,186,185 B2
(45) Date of Patent: Nov. 30, 2021

(54) ROTOR BRAKE EFFECT BY USING ELECTRIC DISTRIBUTED ANTI-TORQUE GENERATORS AND OPPOSING ELECTRIC MOTOR THRUST TO SLOW A MAIN ROTOR

(71) Applicant: Bell Helicopter Textron Inc., Fort Worth, TX (US)

(72) Inventors: Andrew Haldeman, Fort Worth, TX (US); Eric Sinusas, Euless, TX (US); Frank Bradley Stamps, Colleyville, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 555 days.

(21) Appl. No.: 15/609,779

(22) Filed: May 31, 2017

(65) Prior Publication Data

US 2018/0346135 A1 Dec. 6, 2018

(51) Int. Cl.
*B64D 27/24* (2006.01)
*B60L 53/12* (2019.01)
(Continued)

(52) U.S. Cl.
CPC ............. *B60L 53/12* (2019.02); *B64C 27/06* (2013.01); *B64C 27/12* (2013.01); *B64C 27/82* (2013.01);
(Continued)

(58) Field of Classification Search
CPC .... B64C 2027/8209; B64C 2027/8227; B64C 2027/026; B64C 2027/8254;
(Continued)

(56) References Cited

U.S. PATENT DOCUMENTS 2,378,617 A    6/1945  Burke
2,415,622 A *  2/1947  Enea ...................... B64C 27/82
                                                     244/17.13
(Continued)

FOREIGN PATENT DOCUMENTS

DE    102010021026 A1    11/2011
DE    202012001750 U1    3/2012
(Continued)

OTHER PUBLICATIONS

European Patent Office, Extended European Search Report for EP Application Serial No. 18174173.7 dated Oct. 24, 2018, 4 pp.
(Continued)

*Primary Examiner* — Christopher D Hutchens
(74) *Attorney, Agent, or Firm* — Daniel J. Chalker; Edwin S. Flores; Chalker Flores, LLP

(57) ABSTRACT

The present invention includes a system and method for slowing the rotation of a rotor using, for example, rotor brake system for a rotorcraft comprising: one or more generators connected to a main rotor gearbox; an electric distributed anti-torque system mounted on a tail boom of the rotorcraft comprising two or more electric motors connected to the one or more generators, wherein the two or more electric motors are connected to one or more blades; and wherein a rotation of the rotor is slowed by placing a drive load on the main rotor gearbox with the one or more generators to bleed the mechanical power from rotor into electrical power via the two or more electric motors, wherein the electric distributed anti-torque system generates thrust in opposing directions.

35 Claims, 13 Drawing Sheets

(51) Int. Cl.
  *B64C 27/12* (2006.01)
  *B64C 27/82* (2006.01)
  *H02P 3/04* (2006.01)
  *B64C 27/06* (2006.01)
  *H02P 3/14* (2006.01)
  *B64D 27/02* (2006.01)

(52) U.S. Cl.
  CPC ............ *B64D 27/24* (2013.01); *H02P 3/04* (2013.01); *H02P 3/14* (2013.01); *B64C 2027/8209* (2013.01); *B64C 2027/8227* (2013.01); *B64C 2027/8236* (2013.01); *B64C 2027/8254* (2013.01); *B64D 2027/026* (2013.01); *B64D 2221/00* (2013.01)

(58) Field of Classification Search
  CPC . B64C 2027/8236; B64C 27/06; B64C 27/24; B64C 27/12; B64C 27/82; B64D 27/24; B64D 2027/026; B64D 2027/8209; B64D 2207/8227; B64D 2207/8236; B64D 2207/8254; B64D 2221/00; H02P 3/14
  See application file for complete search history.

(56) References Cited

U.S. PATENT DOCUMENTS

| | | | |
|---|---|---|---|
| 2,491,549 A | 12/1949 | Brewster, III | |
| 2,514,205 A * | 7/1950 | McDonald | B64C 27/82 244/17.11 |
| 3,506,219 A * | 4/1970 | Mouille | B64C 27/82 244/17.21 |
| 4,953,811 A | 9/1990 | Smith | |
| 5,269,654 A * | 12/1993 | Chapman | B64C 27/82 244/17.19 |
| 7,032,860 B1 * | 4/2006 | Kirk | B64C 27/006 244/17.15 |
| 8,464,980 B2 | 6/2013 | Certain | |
| 8,757,542 B2 | 6/2014 | Hopdjanian et al. | |
| 8,807,476 B2 | 8/2014 | Raffel et al. | |
| 8,870,114 B2 | 10/2014 | Botti et al. | |
| 8,931,732 B2 | 1/2015 | Sirohi et al. | |
| 8,944,367 B2 | 2/2015 | Bystry, Jr. et al. | |
| 8,960,599 B2 * | 2/2015 | Edwards | B64C 15/00 244/87 |
| 8,979,015 B2 | 3/2015 | Gaillard | |
| 9,004,395 B2 | 4/2015 | Botti et al. | |
| 9,067,676 B1 | 6/2015 | Hethcock et al. | |
| 9,085,355 B2 | 7/2015 | DeLorean | |
| 9,169,027 B2 | 10/2015 | Strauss et al. | |
| 9,174,728 B2 | 11/2015 | Altmijus et al. | |
| 9,181,811 B2 | 11/2015 | Germanetti | |
| 9,194,285 B2 | 11/2015 | Botti et al. | |
| 9,242,728 B2 | 1/2016 | Morrison | |
| 9,248,908 B1 | 2/2016 | Luyks | |
| 9,267,561 B2 | 2/2016 | Conway | |
| 9,446,842 B2 | 9/2016 | Luyks | |
| 9,522,730 B2 | 12/2016 | Smith et al. | |
| 9,592,899 B2 | 3/2017 | Fink | |
| 9,631,516 B2 | 4/2017 | Hamann et al. | |
| 9,758,245 B2 | 9/2017 | Ries | |
| 9,764,822 B2 | 9/2017 | Morrison | |
| 10,450,080 B1 * | 10/2019 | Beach | B64D 27/10 |
| 2004/0217229 A1 | 11/2004 | Arlton | |
| 2008/0277213 A1 * | 11/2008 | Doleschel | B64C 27/12 188/72.6 |
| 2010/0127114 A1 | 5/2010 | Nakayama et al. | |
| 2011/0121128 A1 | 5/2011 | Balkus, Jr. | |
| 2012/0012693 A1 | 1/2012 | Thomassey | |
| 2012/0160954 A1 | 6/2012 | Thomassey | |
| 2013/0092789 A1 | 4/2013 | Botti et al. | |
| 2013/0134256 A1 | 5/2013 | Gaillard | |
| 2013/0147204 A1 | 6/2013 | Botti et al. | |
| 2013/0170985 A1 | 7/2013 | Altmikus et al. | |
| 2013/0264412 A1 | 10/2013 | Dyrla | |
| 2014/0158816 A1 | 6/2014 | DeLorean | |
| 2014/0290208 A1 | 10/2014 | Rechain et al. | |
| 2015/0225078 A1 | 8/2015 | Ries | |
| 2015/0367950 A1 * | 12/2015 | Rajashekara | B64C 11/305 701/3 |
| 2016/0052626 A1 | 2/2016 | Vander Mey | |
| 2016/0083085 A1 | 3/2016 | Strauss et al. | |
| 2016/0200436 A1 * | 7/2016 | North | B64C 29/0033 244/7 R |
| 2016/0272296 A1 | 9/2016 | Fink | |
| 2016/0311528 A1 | 10/2016 | Nemovi et al. | |
| 2017/0066531 A1 | 3/2017 | McAdoo | |
| 2017/0129617 A1 * | 5/2017 | Shah | B64D 27/24 |
| 2017/0174335 A1 | 6/2017 | Waltner et al. | |
| 2017/0174355 A1 | 6/2017 | Malloy | |
| 2017/0203839 A1 * | 7/2017 | Giannini | B64D 29/02 |
| 2017/0225573 A1 * | 8/2017 | Waltner | B64C 27/12 |
| 2017/0225778 A1 * | 8/2017 | Waltner | B64C 27/82 |
| 2017/0253326 A1 | 9/2017 | Mullins | |
| 2017/0253328 A1 | 9/2017 | Wang | |
| 2017/0260872 A1 * | 9/2017 | Munevar | B64D 27/10 |
| 2017/0275009 A1 * | 9/2017 | Huang | B64D 27/10 |
| 2017/0297697 A1 * | 10/2017 | Moffitt | B64C 27/10 |
| 2017/0349273 A1 | 12/2017 | Parsons et al. | |
| 2017/0349274 A1 | 12/2017 | Fenny et al. | |
| 2017/0349276 A1 | 12/2017 | Fenny | |
| 2018/0305005 A1 * | 10/2018 | Parks | B64C 39/12 |

FOREIGN PATENT DOCUMENTS

| | | |
|---|---|---|
| EP | 1976755 | 10/2008 |
| EP | 2155552 | 2/2010 |
| EP | 2186727 A2 | 5/2010 |
| EP | 2327625 A1 | 6/2011 |
| EP | 2404775 A2 | 1/2012 |
| EP | 2412630 A1 | 2/2012 |
| EP | 2571761 | 3/2013 |
| EP | 2571763 | 3/2013 |
| EP | 2571764 | 3/2013 |
| EP | 2610176 | 7/2013 |
| EP | 2631174 A1 | 8/2013 |
| EP | 2636601 A1 | 9/2013 |
| EP | 2739530 | 6/2014 |
| EP | 2821344 A1 | 1/2015 |
| EP | 2933187 A1 | 10/2015 |
| EP | 2982604 A1 | 2/2016 |
| EP | 3116781 | 9/2016 |
| EP | 3137376 | 3/2017 |
| EP | 3216696 A1 | 9/2017 |
| EP | 3251952 | 12/2017 |
| EP | 3254962 A1 | 12/2017 |
| EP | 3254963 A1 | 12/2017 |
| FR | 2951137 A1 | 4/2011 |
| JP | 2009090755 A | 4/2009 |
| WO | 2016/128330 A1 | 8/2016 |
| WO | 2016/164280 A1 | 10/2016 |

OTHER PUBLICATIONS

European Patent Office, Communication pursuant to Article 94(3) EPC for EP Application Serial No. 18174173.7 dated Nov. 8, 2018, 6 pp.
European Patent Office, Extended European Search Report for EP Application Serial No. 17174263.8, dated Oct. 17, 2017, 4 pp.
European Patent Office, Extended European Search Report for EP Application Serial No. 17174337.0, dated Nov. 15, 2017, 5 pp.
European Patent Office, Extended European Search Report for EP Application Serial No. 17174294.3, dated Nov. 14, 2017, 4 pp.

* cited by examiner

ROTOR BRAKE EFFECT BY USING ELECTRIC DISTRIBUTED ANTI-TORQUE GENERATORS AND OPPOSING ELECTRIC MOTOR THRUST TO SLOW A MAIN ROTOR

CROSS-REFERENCE TO RELATED APPLICATIONS

Not applicable.

STATEMENT OF FEDERALLY FUNDED RESEARCH

Not applicable.

TECHNICAL FIELD OF THE INVENTION

This invention is generally in the field of rotor brakes, and more particularly, to a rotor brake effect by using electric distributed anti-torque generators and opposing electric motor thrust to slow the main rotor.

BACKGROUND OF THE INVENTION

Without limiting the scope of the invention, its background is described in connection with rotor brakes.

U.S. Pat. No. 9,267,561 issued to Conway, entitled "Rotor brake control system", describes a rotor brake control system that includes a temperature sensor operable to measure an operating temperature of a rotor brake and a rotor brake control unit operable to instruct a caliper to adjust, based on the measured operating temperature, an amount of friction generated between a brake pad and the rotor brake.

Counter-torque tail rotors are often used in helicopters and are generally mounted adjacent to vertical fins that provide for aircraft stability. In such a configuration, the helicopter rotor produces a transverse airflow. Tail rotors can be driven at high angular velocities to provide adequate aerodynamic responses. Sometimes, vortices produced by a main helicopter rotor and the tail rotor can interact to reduce the efficiency of the thrust created by the rotors. The interference of the vortices may also cause an increase in noise. To address these issues, the vertical fin can be replaced by an annular airfoil (sometimes called a ring wing) having an inner diameter greater than the diameter of the tail rotor and which can be mounted around the tail rotor.

Thus, a need remains for an improved rotor brake system that reduces the speed of the rotor upon landing, with increased safety and a reduction in the wear of parts of the rotor brake system.

SUMMARY OF THE INVENTION

In one embodiment, the present invention includes a rotor brake system for a main rotor of a rotorcraft comprising: one or more generators connected to a main rotor gearbox, wherein the main rotor gearbox is connected to the main rotor; and an electric distributed anti-torque system mounted on a tail boom of the rotorcraft and electrically connected to the one or more generators, wherein the electric distributed anti-torque system comprises two or more electric motors connected to one or more blades; wherein a rotation of the main rotor is slowed by placing a drive load on the main rotor gearbox with the one or more generators to convert mechanical power from the main rotor into electrical power, and wherein the electrical power is dispersed by using the electric distributed anti-torque system to generate thrust in opposing directions. In one aspect, the system further comprises a flight control computer that controls an amount of electrical power generated from the one or more generators and directed to each of the two or more electric motors to generate thrust in opposing directions that minimizes or eliminates a side load on the tail boom. In another aspect, the two or more electric motors are least one of: a self-commutated motor, an externally commutated motor, a brushed motor, a brushless motor, a linear motor, an AC/DC synchronized motor, an electronic commutated motor, a mechanical commutator motor (AC or DC), an asynchronous motor (AC or DC), a pancake motor, a three-phase motor, an induction motor, an electrically excited DC motor, a permanent magnet DC motor, a switched reluctance motor, an interior permanent magnet synchronous motor, a permanent magnet synchronous motor, a surface permanent magnet synchronous motor, a squirrel-cage induction motor, a switched reluctance motor, a synchronous reluctance motor, a variable-frequency drive motor, a wound-rotor induction motor, an ironless or coreless rotor motor, or a wound-rotor synchronous motor. In another aspect, the electric distributed anti-torque system is defined further as comprising 2, 3, 4, 5, 6, 7, 8, 9, 10, 11, 12, 13, 14, 15, or more electric motors. In another aspect, the two or more electric motors are at least one of: turned on or off independently, turned on or off as a group, turned one or off in pairs, turned on and off in pulses, or each motor can operate independently to direct thrust in a same or a different direction wherein an overall thrust generated by the two or more electric motors fails to provide a significant side load on the tail boom. In another aspect, additional electrical power is bled from the one or more generators by converting electrical power into heat via a heat sink, deicing blankets, compressing a gas or liquid in a reservoir. In another aspect, the two or more electric motors are a different size, the plurality of blades are a different size, the two or more electric motors are individually ducted, or the blades and the two or more electric motors are on a pivot that allows for rotation of the two or more electric motors to minimize loads in any direction and to minimize or eliminate a side load on the tail boom. In another aspect, the system further comprises a control logic in a flight control computer for at least one of: calculates the overall torque generated by the electric distributed anti-torque system to reduces or eliminates torque and reduce the speed of the main rotor prior to applying a mechanical rotor brake. In another aspect, the one or more blades are fixed-pitch blades, variable-pitch blades, or a combination thereof.

In another embodiment, the present invention includes a rotor brake system for a rotor of a rotorcraft comprising: one or more generators connected to a main rotor gearbox; an electric distributed anti-torque system mounted on a tail boom of the rotorcraft that comprises two or more variable speed electric motors connected to the one or more generators, wherein the two or more variable speed electric motors are connected to one or more blades that provide anti-torque thrust; and wherein a rotation of the rotor is slowed by placing a drive load on the main rotor gearbox with the one or more generators to bleed the mechanical power from rotor into electrical power via the two or more variable speed electric motors, wherein each of the two or more variable speed electric motors generate thrust in opposing directions; and a mechanical rotor brake. In one aspect, the system further comprises a flight control computer that controls the electrical power generated by the one or more generators and directed to the two or more variable speed electric motors to minimize, reduce, or eliminate a side load on the tail boom. In another aspect, the system further comprises a logic in a flight control computer that controls at least one of: the speed, the direction, or both the speed and direction, of each of the two or more electric motors to minimize, reduce, or eliminate a side load on the tail boom. In another aspect, the two or more variable speed electric motors is at least one of: a self-commutated motor, an externally commutated motor, a brushed motor, a brushless motor, a linear motor, an AC/DC synchronized motor, an electronic commutated motor, a mechanical commutator motor (AC or DC), an asynchronous motor (AC or DC), a pancake motor, a three-phase motor, an induction motor, an electrically excited DC motor, a permanent magnet DC motor, a switched reluctance motor, an interior permanent magnet synchronous motor, a permanent magnet synchronous motor, a surface permanent magnet synchronous motor, a squirrel-cage induction motor, a switched reluctance motor, a synchronous reluctance motor, a variable-frequency drive motor, a wound-rotor induction motor, an ironless or coreless rotor motor, or a wound-rotor synchronous motor. In another aspect, additional electrical power is bled from the one or more generators by at least one of: operating both an air-conditioning and a heater simultaneously, charging a battery on the rotorcraft or on the ground, or inductive transfer. In another aspect, additional electrical power is bled from the one or more generators by converting electrical power into heat via a heat sink, deicing blankets, compressing a gas or liquid in a reservoir. In another aspect, the two or more variable speed electric motors are a different size, the plurality of blades are a different size, the two or more variable speed electric motors are individually ducted, or each of the blades and the two or more variable speed electric motors are on a pivot that allows for rotation of each of the two or more variable speed electric motors to minimize loads in any direction. In another aspect, the system further comprises a control logic in a flight control computer for at least one of: calculates the overall torque generated by the two or more variable speed electric motors to reduces or eliminates torque and reduce the speed of the main rotor. In another aspect, the one or more blades are fixed-pitch blades, variable-pitch blades, or a combination thereof.

In yet another embodiment, the present invention includes a method of operating a rotor brake system for a helicopter, the method comprising: providing one or more generators connected to a main rotor gearbox transmission; connecting two or more variable speed electric motors mounted on a tail boom of the helicopter, wherein each of the two or more variable speed motors are connected to one or more blades to provide anti-torque thrust; reducing the rotation of the rotor by placing a drive load on the main rotor gearbox with the one or more generators to convert a mechanical power from the rotor into electrical power; and using the electrical power generated by the one or more generators to run the at least two variable speed electric motors to generate thrust in opposing directions, wherein the rotation of the rotor is reduced prior to engaging a mechanical rotor brake. In another aspect, the method further comprises providing a flight control computer that controls the electrical power generated by the one or more generators and directed to the two or more variable speed electric motors to minimize, reduce or eliminate a side load on the tail boom. In another aspect, the method further comprises a logic in a flight control computer for controlling at least one of: the speed, the direction, or both the speed and direction, of each of the two or more electric motors to minimize, reduce, or eliminate a side load on the tail boom. In another aspect, the two or more variable speed electric motors is at least one of: a self-commutated motor, an externally commutated motor, a brushed motor, a brushless motor, a linear motor, an AC/DC synchronized motor, an electronic commutated motor, a mechanical commutator motor (AC or DC), an asynchronous motor (AC or DC), a pancake motor, a three-phase motor, an induction motor, an electrically excited DC motor, a permanent magnet DC motor, a switched reluctance motor, an interior permanent magnet synchronous motor, a permanent magnet synchronous motor, a surface permanent magnet synchronous motor, a squirrel-cage induction motor, a switched reluctance motor, a synchronous reluctance motor, a variable-frequency drive motor, a wound-rotor induction motor, an ironless or coreless rotor motor, or a wound-rotor synchronous motor. In another aspect, the two or more variable speed electric motors further comprises 1, 2, 3, 4, 5, 6, 7, 8, 9, 10, 11, 12, 13, 14, 15, or more additional electric motors. In another aspect, the two or more variable speed electric motors can be at least one of: turned on or off independently, turned on or off as a group, turned one or off in pairs, or each motor can operate independently to direct thrust in a same or a different direction to generate an overall thrust that does not create a significant side load on the tail boom. In another aspect, additional electrical power is bled from the one or more generators by at least one of: operating both an air-conditioning and a heater simultaneously, charging a battery on the rotorcraft or on the ground, or inductive transfer. In another aspect, additional electrical power is bled from the one or more generators by converting electrical power into heat via a heat sink, deicing blankets, compressing a gas or liquid in a reservoir. In another aspect, the two or more variable speed electric motors are a different size, the plurality of blades are a different size, the two or more variable speed electric motors are individually ducted, or each of the blades and the two or more variable speed electric motors are on a pivot that allows for rotation of the individual fixed pitch blades and the variable speed electric motors to minimize loads in any direction. In another aspect, the method further comprises connecting a control logic in a flight control computer to: calculate the overall torque generated by the two or more variable speed electric motors to reduces or eliminates torque and reduce the speed of the main rotor. In another aspect, the one or more blades are fixed-pitch blades, variable-pitch blades, or a combination thereof.

In another embodiment, the present invention includes a helicopter comprising: a fuselage, an engine in the fuselage, a transmission connected to the engine, and a main rotor connected to the transmission; one or more generators connected to a main rotor gearbox; an electric distributed anti-torque system mounted on a tail boom of the rotorcraft comprising two or more electric motors connected to the one or more generators, wherein the two or more electric motors are connected to one or more blades; and wherein a rotation of the rotor is slowed by placing a drive load on the main rotor gearbox with the one or more generators to bleed the mechanical power from rotor into electrical power via the electric distributed anti-torque system that generates thrust in opposing directions; and a mechanical rotor brake. In one aspect, a flight control computer that controls the electrical power generated from the one or more generators and directed to the two or more electric motors to minimize a side load on the tail boom. In another aspect, additional electrical power is bled from the one or more generators by at least one of: operating both an air-conditioning and a heater simultaneously, charging a battery on the rotorcraft or on the ground, or an inductive transfer of electrical power. In another aspect, additional electrical power is bled from the one or more generators by converting electrical power into heat via a heat sink, deicing blankets, compressing a gas or liquid in a reservoir. In another aspect, the one or more blades are fixed-pitch blades, variable-pitch blades, or a combination thereof.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
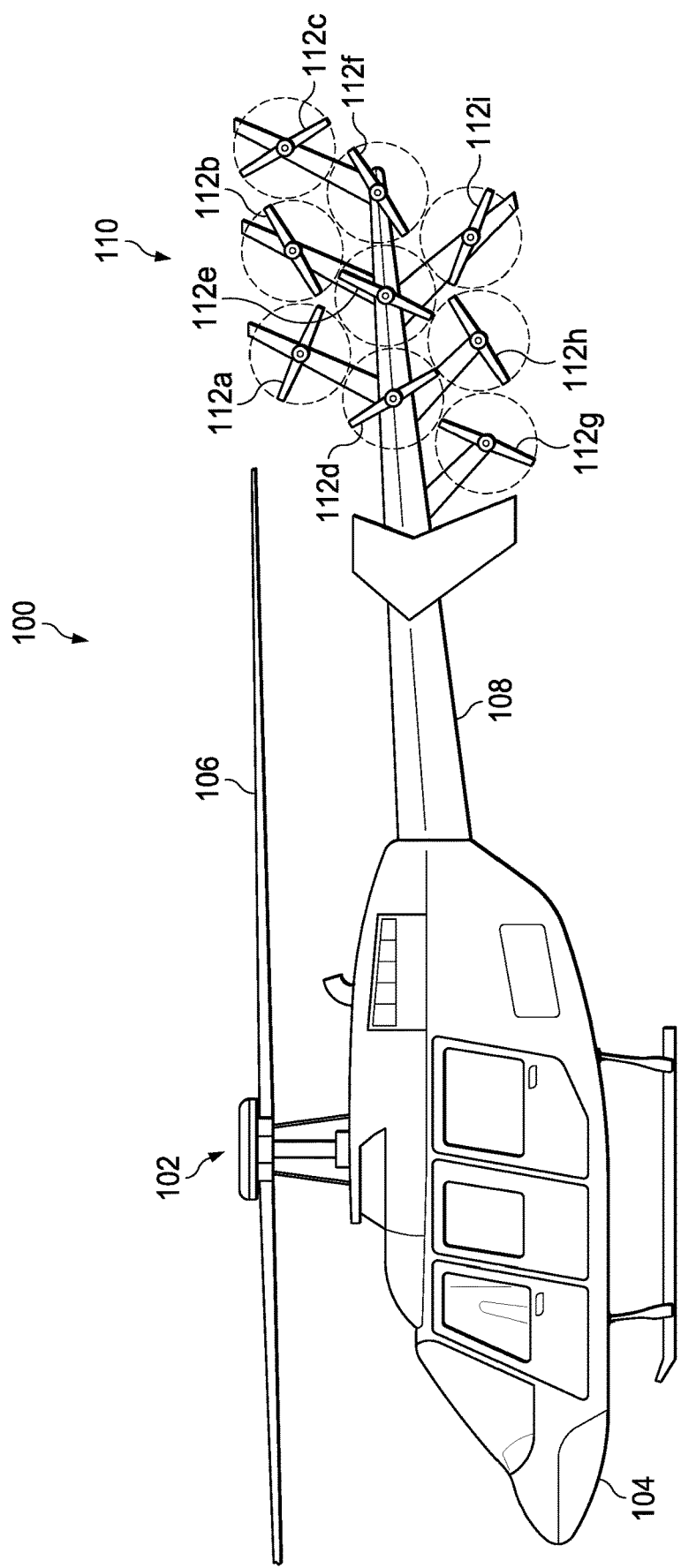
FIG. 1 is a side-view schematic diagram of a helicopter showing an anti-torque matrix shown with fixed or variable blade pitch motors.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention uses the generators that power an Electric Distributed Anti-Torque (EDAT) system to put a drive load on the main rotor gearbox to slow down a main rotor of a rotorcraft. For example, the load added to the main rotor gearbox via the one or more electrical generators connected to the main rotor gearbox is used to add a load that slows down the main rotor after landing. The one or more generators are needed to power a group of electric anti-torque motors with blades or fans that serve to provide anti-torque for the rotorcraft, but also to slow down the main rotor after the main engine is shut down. The present invention works by using the generators to slow down the drive train after landing, bleeding off the electric power generated thereby. Further, the present invention can be used before, or in conjunction with, a rotor brake that uses friction to slow down the drive train. The resulting electric power can be sent to the EDAT system to absorb the power without friction and heating of a rotor brake in the drive line. At least two electric thruster motors are used with opposing thrust without creating a side load on the tail boom. The amount of power to the electric motors in the EDAT system can be increased to slow the rotor before the application of a rotor brake.

In addition to the EDAT system, the present invention can also absorb the electrical power generated by the generators by using the electrical power to, e.g., operate both an air-conditioning and a heater simultaneously, charge a battery on the rotorcraft or on the ground, or use inductive transfer of electrical power to transfer electricity to a battery on or off the rotorcraft (e.g., into an electric grid). The present invention can also absorb the electrical power generated by the generators such as, by converting electrical power into heat via a heat sink, deicing blankets, or even compressing a gas or liquid in a reservoir. In the case of power transfers away from the rotorcraft, the electrical power can be transferred via wires that are connected to the rotorcraft upon landing, or even inductively transfer the electrical power to a surface on which the rotorcraft has landed.

Most helicopters with a single, main rotor system require a separate rotor to overcome torque. This is traditionally accomplished on helicopters using a variable pitch, anti-torque tail rotor receiving power from the engine(s) through shafts and gearboxes. While many attempts have been made to power a traditional single tail rotor directly using a large electric motor to replace traditional shafts and gearboxes. These attempts proved to be impractical however clue to the excessive weight of an electric motor capable of providing the required torque and speed to power a traditional tail rotor. Additionally the safety reliability of a single or even a dual electric motor does not approach the safety reliability of shafts and gearboxes.

The present invention may also include an anti-torque control using a matrix of fixed or variable blade pitch motor modules that form the EDAT system, which reduces the excessive weight and safety reliability issues with a single electrically powered anti-torque variable pitch tail rotor blade by utilizing an EDAT system that includes a matrix of small fixed or variable blade pitch electric motor modules in place of a traditional tail rotor.

The present invention has certain advantages over prior tail-rotor configurations. One such advantage is the low rotational inertia of the individual fixed or variable blade pitch electric motors that together form the anti-torque matrix, wherein the individual motors can be individually controlled to have their speed and direction changed rapidly. The present invention also eliminates the complexity of a variable blade pitch system. An advantage of the present invention includes the use of small size of fixed or variable blade pitch electric motor modules provides adequate convection cooling, eliminating requirement for active cooling system. Further, operating a large number of fixed or variable blade pitch electric motor modules provides safety reliability from component failures through a high level of redundancy without excessive weight. In addition, the wide distribution of fixed or variable blade pitch electric motor modules provides for increased safety from external threats such as collision and lightning. Also, when a helicopter is on the ground with main rotor turning, the lower inertia of the fixed or variable blade pitch electric motor modules and the ability to shut them down completely reduces the injury risk from blade contact to personnel. Moreover, the present invention increases cruise efficiency by slowing down or stopping selected fixed or variable blade pitch electric motor modules. Another important advantage of the present invention is reduced passenger noise and vibration by operating the matrix of fixed or variable blade pitch electric motor modules at slower speeds, or stopping selected fixed or variable blade pitch electric motor modules. The present invention also reduces objectionable ground noise in hover by operating the matrix of fixed or variable blade pitch electric motor modules at different individual speeds to distribute frequencies across a wide band. During operation, the present invention can increase stability during flight by providing a yaw stability augmentation capability through fly-by-wire controls. Finally, the speed of fixed or variable blade pitch electric motor modules can be increased when operating at higher altitudes to compensate for decrease in thrust. The present invention also provides an increase in cruise efficiency through directional optimization of thrust angle of the anti-torque matrix.

The present invention uses a convertible helicopter anti-torque matrix that uses fixed or variable blade pitch electrically-driven motors, variable-speed motors for ground and low speed forward flight. The entire anti-torque matrix, or individual motors, pairs of motors, or other combinations of motors, can have a surrounding ring or cowling that acts in place of a traditional tail rotor of a helicopter and that is connected to the helicopter via a pivot that can be used to direct the thrust of one or more motors of the anti-torque matrix. Alternatively, individual fixed or variable blade pitch electrically can each have a surrounding ring or cowling that is connected to a pivot. The combined blades of the various tail rotor motors that form the module can each provide separate thrust. The anti-torque matrix fixed can include two, three, four, five, six, seven, eight, nine, ten or more individual fixed or variable blade pitch variable-speed motors, which can operate alone or in one or more combinations and in one or more directions. Further, the present invention includes having co-axial (or offset) pairs of motors that are positioned in parallel to provide outward thrust.

When provided within a cowling, the various vortices can be captured to form a circulating air pattern, which can act as a pump to draw additional air through the center of the fixed or variable blade pitch electrically from the region adjacent the upstream surface of motors. The circulating air pattern and eduction can increase the diameter of the wake and the volume of air transported by the anti-torque matrix. The wake of the anti-torque matrix can be transported at a slow rate while including a greater mass of air by the operation of the combined fixed or variable blade pitch electrically-driven, variable-speed motors, thus resulting in increased efficiency in the operation of the overall anti-torque matrix that acts as a tail rotor.

By using smaller individual electric motors, each having their own fixed pitch propeller, the overall rotational energy of each propeller is much smaller and can even use softer or even frangible materials that will protect any ground crews when coming into contact during a hover or slow flight, while still providing the additive aerodynamic forces to control aircraft yaw, roll or pitch in forward flight.

The fixed or variable blade pitch electrically can provide longitudinal pitch trim and lateral yaw trim. In cruise mode, the flow axis of the fixed or variable blade pitch electrically is aligned generally with or along the long axis of the fuselage to serve as a horizontal stabilizer. In hover mode, the arrangement of the fixed or variable blade pitch electrically eliminates the down load of a horizontal tail surface that may arise due to interference with the down wash from the main rotor. The fixed or variable blade pitch electrically can also off-load the anti-torque matrix in forward flight by positioning itself with a yaw-direction incidence angle via a pilot trim control, thereby reducing power consumption. The anti-torque matrix presents a surface area in sideward flight, and can thereby serve in a passive roll as a yaw damper. The anti-torque matrix can also help reduce the size of a horizontal stabilizer. Alternatively or in addition, application of the anti-torque matrix can allow for the elimination of both vertical and horizontal surfaces normally utilized on conventional helicopters. This can allow a reduction in weight, download for a horizontal stabilizer in the rotor wake and reduced projected side area and drag in lateral (side) flight.

The present invention addresses the limitations of current electric motor technology and takes advantage or the unique performance capabilities of electric motors for use in helicopter anti torque control. Currently available electric motor technology has limited practicality for use as direct replacements of mechanical drive trains, turbine engines or internal combustion (IC) engines on aircraft. This is because in spite of recent advances in electric motor and battery technology, the comparable power density (power output per unit weight of a motor) becomes less practical with increasing motor size. This is why electric motors work so well on small, unmanned aircraft, but are still impractical for more than limited range use on very fight fixed wing aircraft.

The invention takes advantage of the unique performance capabilities of electric motors for use in helicopter anti-torque control. Using this distributed electric propulsion design and today's flight control technology, each motor can be controlled independently to vary individual motor thrust, and thereby position the anti-torque matrix (hinged at the center and free to rotate about the vertical axis) for optimum overall thrust (direction and magnitude). In hover mode, a helicopter requires anti-torque thrust perpendicular to the airframe's centerline. As the helicopter increases its forward airspeed, this perpendicular thrust requirement reduces. As the anti-torque thrust requirement reduces, the speed of the motors can be varied to optimize power utilization and overall aircraft performance.

Since electric motor power density becomes less practical with increasing motor size, "distributed propulsion" makes use a larger quantity of smaller motors. Combining the shaft output of multiple small motors into a single shaft output using a gearbox wipes out any weight savings and introduces thermal issues, which can require the addition of fluid cooling systems and even more weight. However, by distributing multiple small motors over the airframe, the total aircraft structural weight can be reduced by spreading smaller propulsion induced loads across the entire aircraft. Separating the motors by at least a rotor diameter also provides effective convection cooling. With existing electric power storage technology (batteries, fuel cells) the application of distributed propulsion on manned fixed wing aircraft is becoming more practical, but range is very limited. In the event of depletion of stored energy a fixed wing aircraft can still possibly glide to a safe landing. This is not the same case with application of Distributed Propulsion for lift propulsion on helicopters. On helicopters with distributed propulsion, the rotational inertia of the multiple small rotors is inadequate to support autorotation for safe landing. This combined with the higher power demands required for vertical lift rotors makes pure electric helicopters impractical until a dramatic increase in electric power storage technology occurs.

On manned helicopter configurations incorporating distributed propulsion, a dedicated system for anti-torque control is not required. Multiple small rotors cancel out each others torque and changing rotor speeds can generate control yaw. Therefore, the application of Distributed Propulsion specifically for anti-torque control appears to have been overlooked.

For example, using a Bell model 407 tail rotor for sizing analysis, using existing commercially available electric Sport Light application electric motors and propellers, it is possible to generate equivalent thrust with a matrix of 3×3 or 4×4 fixed or variable blade pitch electric motor modules in approximately the same disc area. With an approximate fixed or variable blade pitch electric motor module conservative weight of 5 pounds (2.2 kilos) (for 3×3 matrix), the total weight minus structure and system installation is 45 pounds (20 kilos). This weight is comparable to the current 407 rotor and gearbox weight. The one starter/generator on the 407 does not provide adequate power or reliability to support operation of the matrix of fixed or variable blade pitch motor modules of the present invention. However, the elimination of the tail rotor output shaft provides for a main rotor gearbox accessory drive pad to mount redundant generators. Because the added generator capacity is over sized for safety reliability, with both generators operating approximately 40 kW power can be made available for non-flight critical uses. Similar calculations apply to the use of other types of electric motors.

Another advantage of the use of a matrix of fixed or variable blade pitch motor modules is that, in the event of loss of all aircraft engine power, the power demand for anti-torque control thrust becomes minimal. Therefore, the impact on the aircrafts electric power systems and rotor energy is also minimal in the event of an auto rotation landing. With increasing forward flight speed the interaction of airflow between rotors results in the aft-most rotors losing their effectiveness. Commensurately, with increasing forward speed the anti-torque thrust required decreases. Therefore with increasing forward speed the aft most modules will be progressively shut off to eliminate unneeded power consumption and reduce noise.

The present invention uses two or more electric motors. Non-limiting examples of electric motors for use with the present invention include: a self-commutated motor, an externally commutated motor, a brushed motor, a brushless motor, a linear motor, an AC/DC synchronized motor, an electronic commutated motor, a mechanical commutator motor (AC or DC), an asynchronous motor (AC or DC), a pancake motor, a three-phase motor, an induction motor, an electrically excited DC motor, a permanent magnet DC motor, a switched reluctance motor, an interior permanent magnet synchronous motor, a permanent magnet synchronous motor, a surface permanent magnet synchronous motor, a squirrel-cage induction motor, a switched reluctance motor, a synchronous reluctance motor, a variable-frequency drive motor, a wound-rotor induction motor, an ironless or coreless rotor motor, or a wound-rotor synchronous motor.

FIG. 1 is a side-view schematic diagram of a helicopter 100 having the anti-torque matrix 110, depicted in this version with nine fixed or variable blade pitch motors 112a-112i, which can be fixed or variable blade pitch electrically-driven and/or variable-speed motors. The helicopter 100 includes a rotary system 102 carried by a fuselage 104. Rotor blades 106 connected to the rotary system 102 provide flight for the helicopter 100. The rotor blades 106 are controlled by multiple controllers within the fuselage 104. For example, during flight, a pilot can manipulate cyclic controllers (not shown) for changing a pitch angle of the rotor blades 106 and/or manipulate pedals (not shown) to provide vertical, horizontal and yaw flight control. The helicopter 100 has a tail boom 108, which supports the anti-torque matrix 110 at the aft end. Each of the fixed or variable blade pitch motors 112a-112i can be operated individually or in groups to provide counter-torque force for transversely stabilizing the helicopter 100. Each of the fixed or variable blade pitch motors 112a-112i is mounted as part of the anti-torque matrix 110 on the tail boom 108. The anti-torque matrix 110 is centered on a hub such that a leading edge of the anti-torque matrix 110 is presented to the side of the helicopter 100 toward the tail boom 108. For example, when a single main rotor the helicopter 100 is rotating counter-clockwise when viewed from above, the leading edge of anti-torque matrix 110 is to the right (starboard) side of the helicopter 100.

Figure 2:
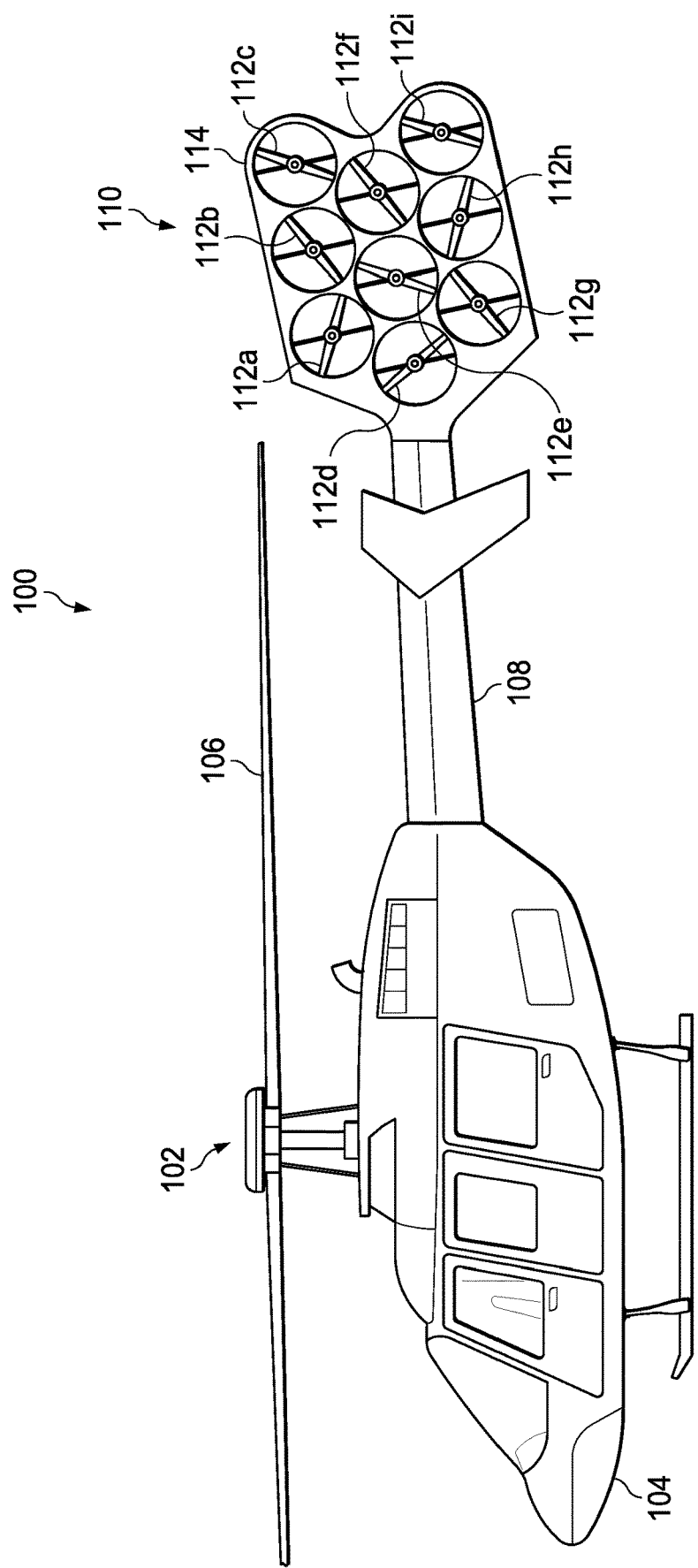
FIG. 2 shows the use of multiple ducted rotors to generate anti torque thrust.

FIG. 2 shows the use of multiple ducted rotors to generate anti torque thrust. In this example a helicopter 100 has the anti-torque matrix 110, depicted in this version with nine fixed or variable blade pitch motors 112a-112i, which can be fixed or variable blade pitch electrically-driven and/or variable-speed motors, each of which are individually ducted. The anti-torque matrix 110 can further include a surface 114 that forms part of the ducting for the nine fixed or variable blade pitch motors 112a-112i. As is the case with the helicopter in FIG. 1, the helicopter 100 includes a rotary system 102 carried by a fuselage 104. Rotor blades 106 connected to the rotary system 102 provide flight for the helicopter 100. The rotor blades 106 are controlled by multiple controllers within the fuselage 104. For example, during flight, a pilot can manipulate cyclic controllers (not shown) for changing a pitch angle of the rotor blades 106 and/or manipulate pedals (not shown) to provide vertical, horizontal and yaw flight control. The helicopter 100 has a tail boom 108, which supports the anti-torque matrix 110 at the aft end, which also permits rotation of the anti-torque matrix 110 about the longitudinal axis of the tail boom 108. Each of the fixed or variable blade pitch motors 112a-112i can be operated individually or in groups to provide counter-torque force for transversely stabilizing the helicopter 100. Each of the fixed or variable blade pitch motors 112a-112i is mounted as part of the anti-torque matrix 110 on the tail boom 108. The anti-torque matrix 110 is centered on a hub such that a leading edge of the anti-torque matrix 110 is presented to the side of the helicopter 100 toward the tail boom 108. For example, when a single main rotor the helicopter 100 is rotating counter-clockwise when viewed from above, the leading edge of anti-torque matrix 110 is to the right (starboard) side of the helicopter 100.

In operation, the anti-torque matrix 110 is oriented substantially in-plane with the tail boom 108 of the helicopter 100 during a first mode of helicopter operation. The skilled artisan will recognize that the anti-torque matrix 110 may be a first anti-torque matrix 110, with a second anti-torque matrix 110 that is substantially parallel to the first providing additional motors and fixed pitch blades that, generally, will be facing outwardly from each other, with the motors being in the center of the anti-torque matrix 110. Generally, the motors will be co-axial, however, in certain embodiments the motors do not have to be co-axial. Further, while FIGS. 1 and 2 shows the anti-torque matrix 110 are being in the form of a 3×3 matrix, that is generally rhomboid in shape, the skilled artisan will recognize that the anti-torque matrix 110 can have any shape and include 2, 3, 4, 5, 6, 7, 8, 9, 10, 11, 12, 13, 14, 15 or more motors, which motors could also be in co-axial pairs. Further, the anti-torque matrix 110 can have any shape, such as round, oval, crescent-shaped, J-shaped, diagonal, square, rectangular, triangular, pentagonal, hexagonal, polygonal, rhomboid, trapezoid, X-shaped, Y-shaped, or kite shaped, For example, the first mode of helicopter operation is a hover mode, which is typically a mode in which the helicopter 100 is sitting on or about the ground with the anti-torque matrix 110 provides thrust from the one or more fixed or variable blade pitch motors 112a-112i when the helicopter 100 is operating in slow speed flight. In this orientation, the anti-torque matrix 110 can provide maneuverability and trim to the helicopter operation. During hover, the direction of thrust of the one or more fixed or variable blade pitch motors 112a-112i of the anti-torque matrix 110 can be in opposing directions, for example, one subset of motors can direct their thrust in one direction, while another subset can be directed in the opposite direction to provide finer rotational control to the helicopter 100. Of course, the speed of the individual motors can also be varied, under control of a logic in a flight control computer that calculates the position of the anti-torque matrix 110 during transition to and from the first to the second mode of operation and for independently controlling individual fan speeds to position the matrix for optimum thrust angle, as well as optimum thrust magnitude.

In a second mode of operation, the anti-torque matrix 110 is oriented substantially off-plane with the tail boom 108 of the helicopter 100 during a second mode of helicopter operations that is different from the first mode. For example, the second mode of helicopter operation is a flight mode (e.g., a low to high speed forward flight mode). In the flight mode, the orientation of the anti-torque matrix 110 is changed from being substantially co-planar with the tail boom 108 to being non-planar. For example, the anti-torque matrix 110 can be substantially perpendicular with the plane of the tail boom 108, by pivoting about pivot. Alternatively, the orientation of the anti-torque matrix 110 can be anywhere between co-planar and perpendicular relative to the tail boom 108.

FIGS. 3A-3F and FIGS. 4A-4F show several variations of the matrix patterns of the variable speed motors of the present invention that provide higher efficiency and reduced overall size. The skilled artisan will recognize that there are an infinite number of possible variations of number of rotors and pattern of rotor positions when using 2, 3, 4, 5, 6, 7, 8, 9, 10, 11, 12, 13, 14, 15 or more electric motors. Of course, the different motors could also be ducted in groups of 2, 3, 4, 5, or more, again, having a variety of shapes and sizes. In addition, different motors could be different sizes and also the blades could also vary in size throughout the matrix.

Figure 3A:
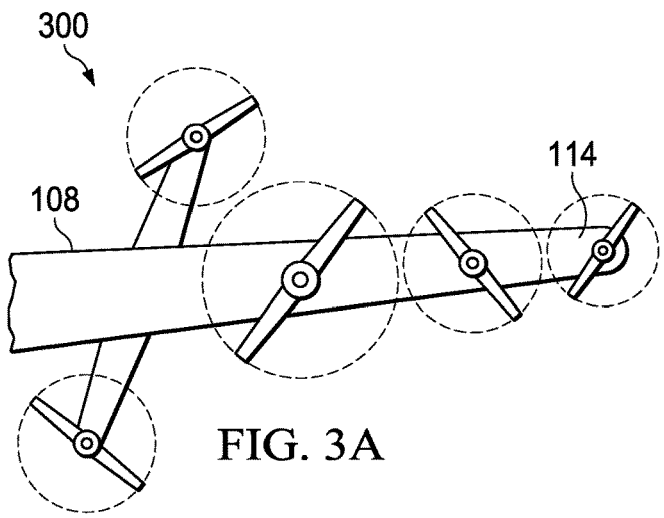
FIGS. 3A-3F show various schematic diagrams of anti-torque matrix, of the present invention that provide higher efficiency and reduced overall size.
Figure 3B:
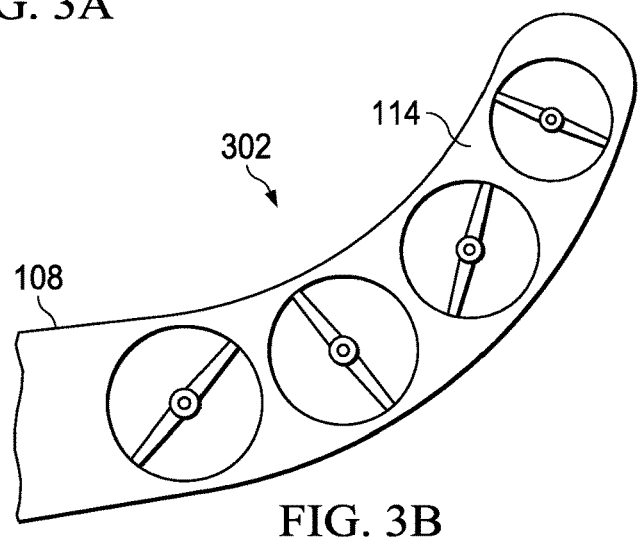
Figure 3C:
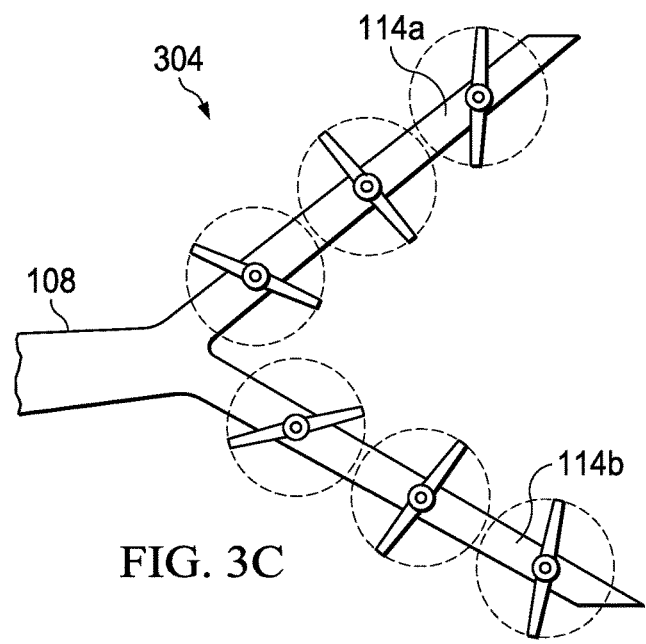
Figure 3D:
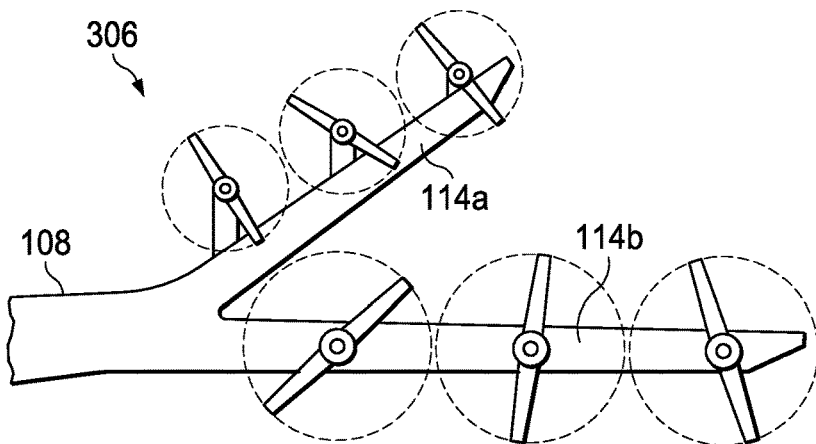
Figure 3E:
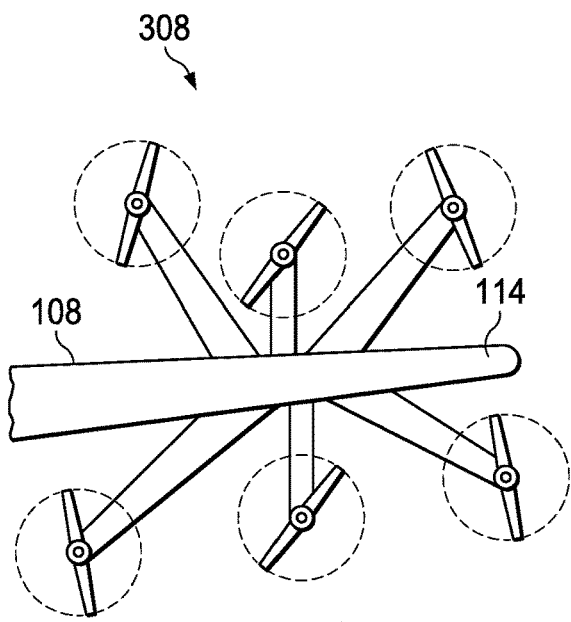
Figure 3F:
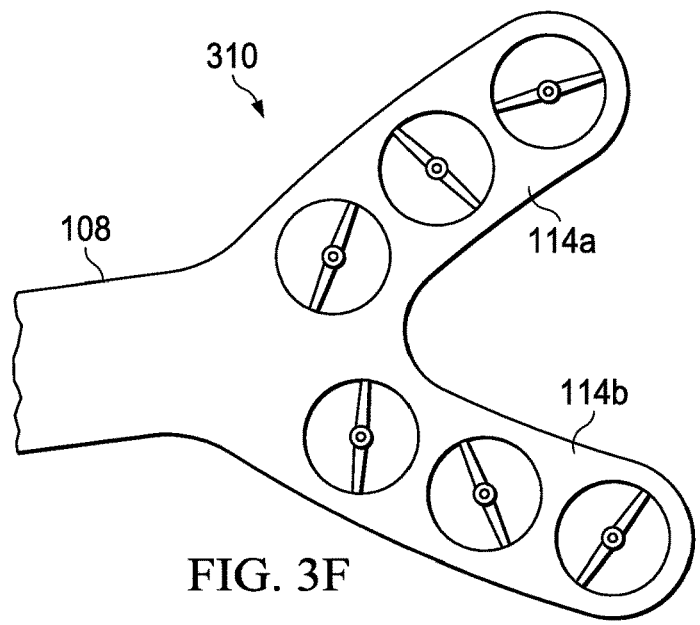
Figure 4A:
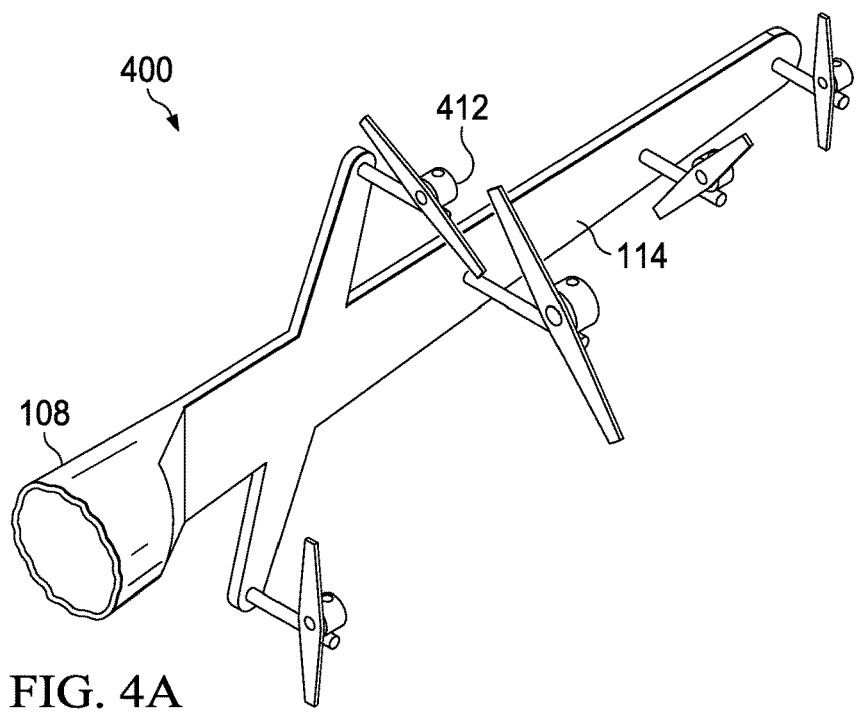
FIGS. 4A-4F show various schematic diagrams of anti-torque matrix, of the present invention that provide higher efficiency and reduced overall size.
Figure 4B:
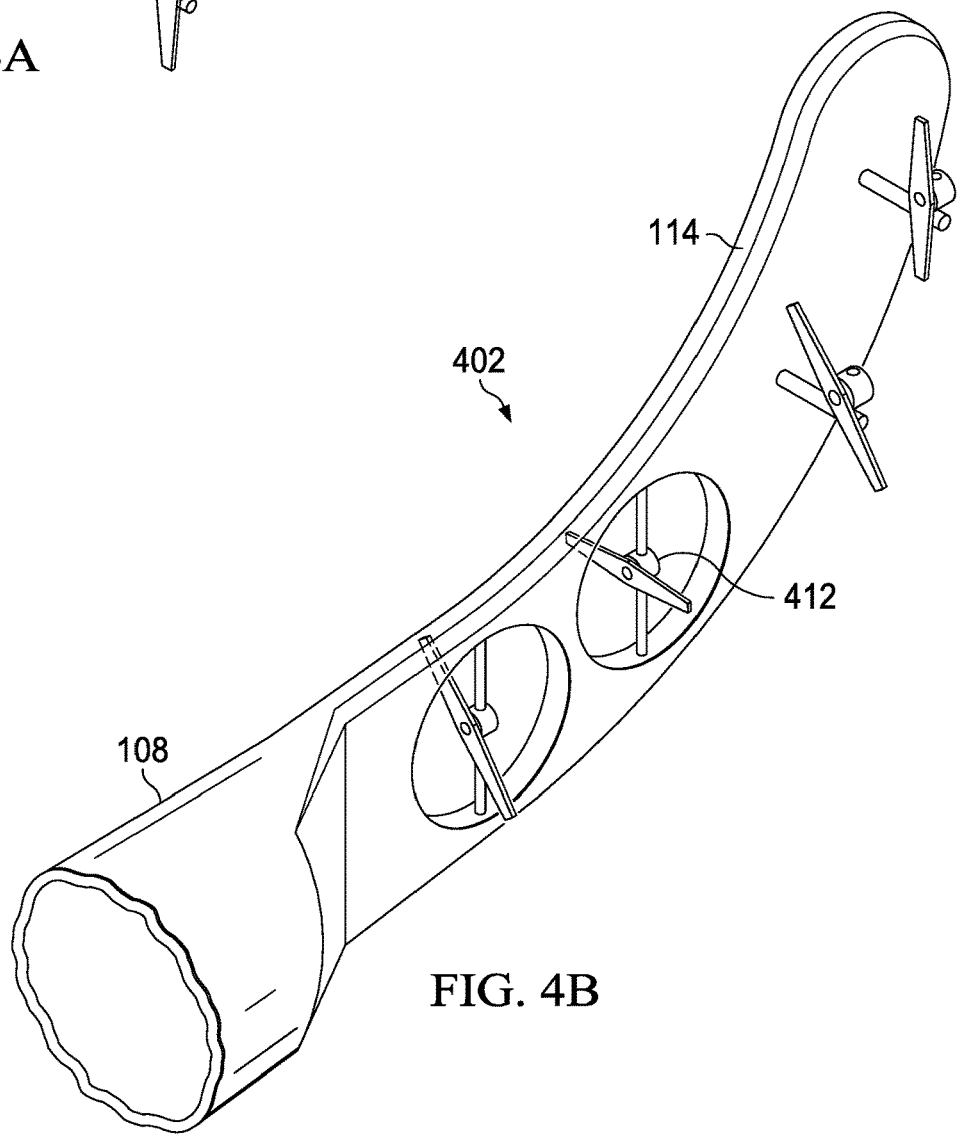
Figure 4C:
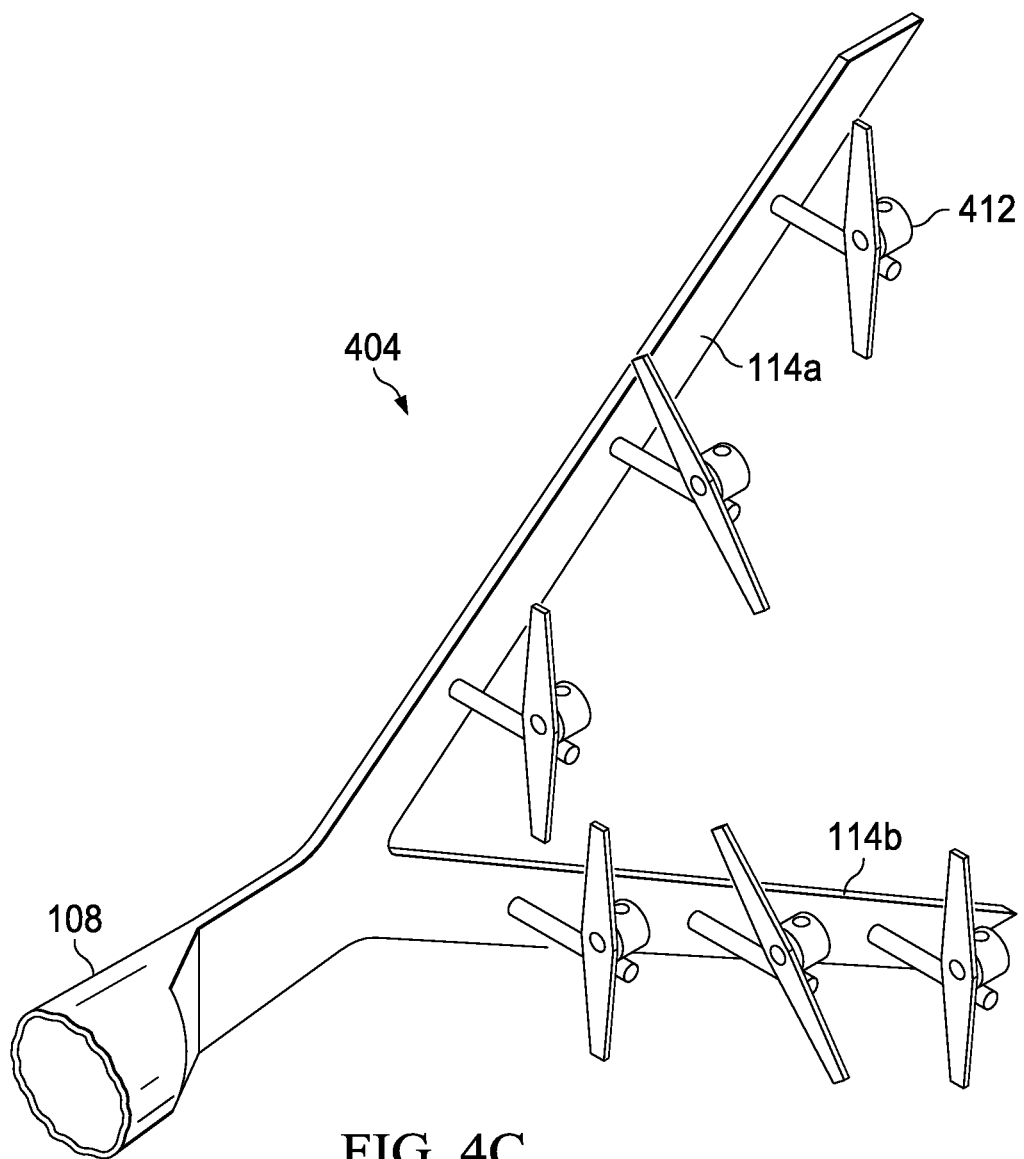
Figure 4D:
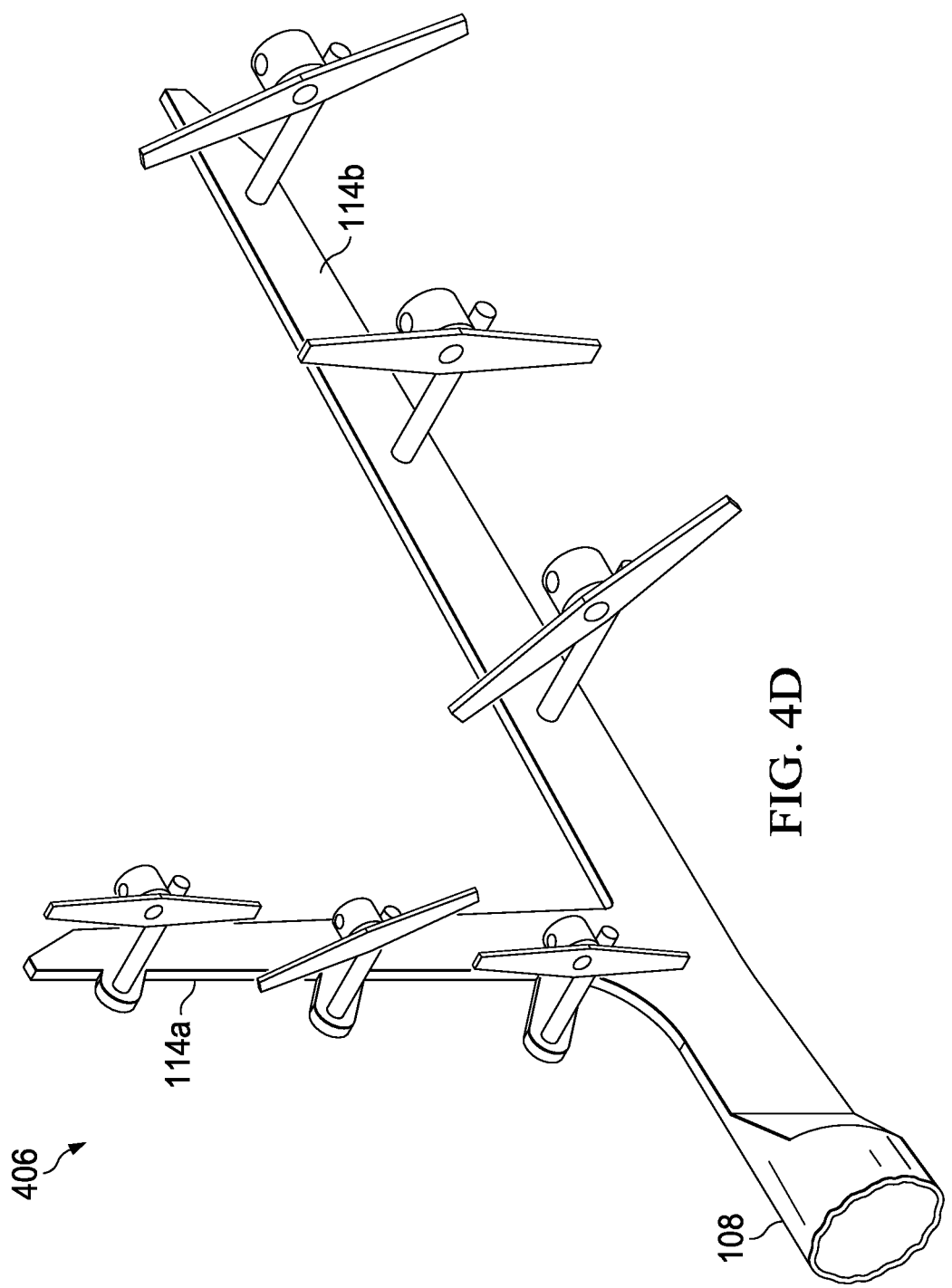
Figure 4E:
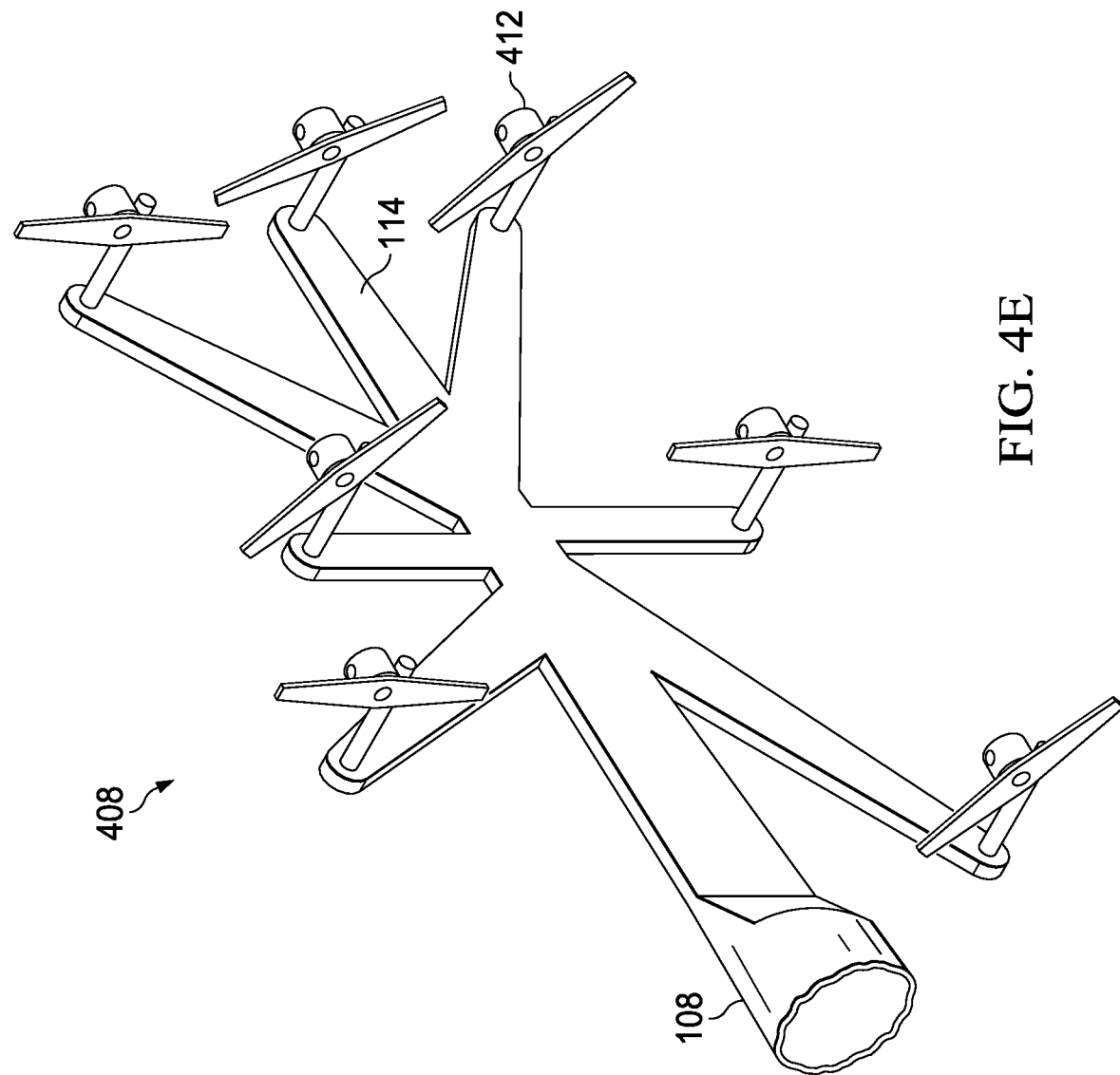
Figure 4F:
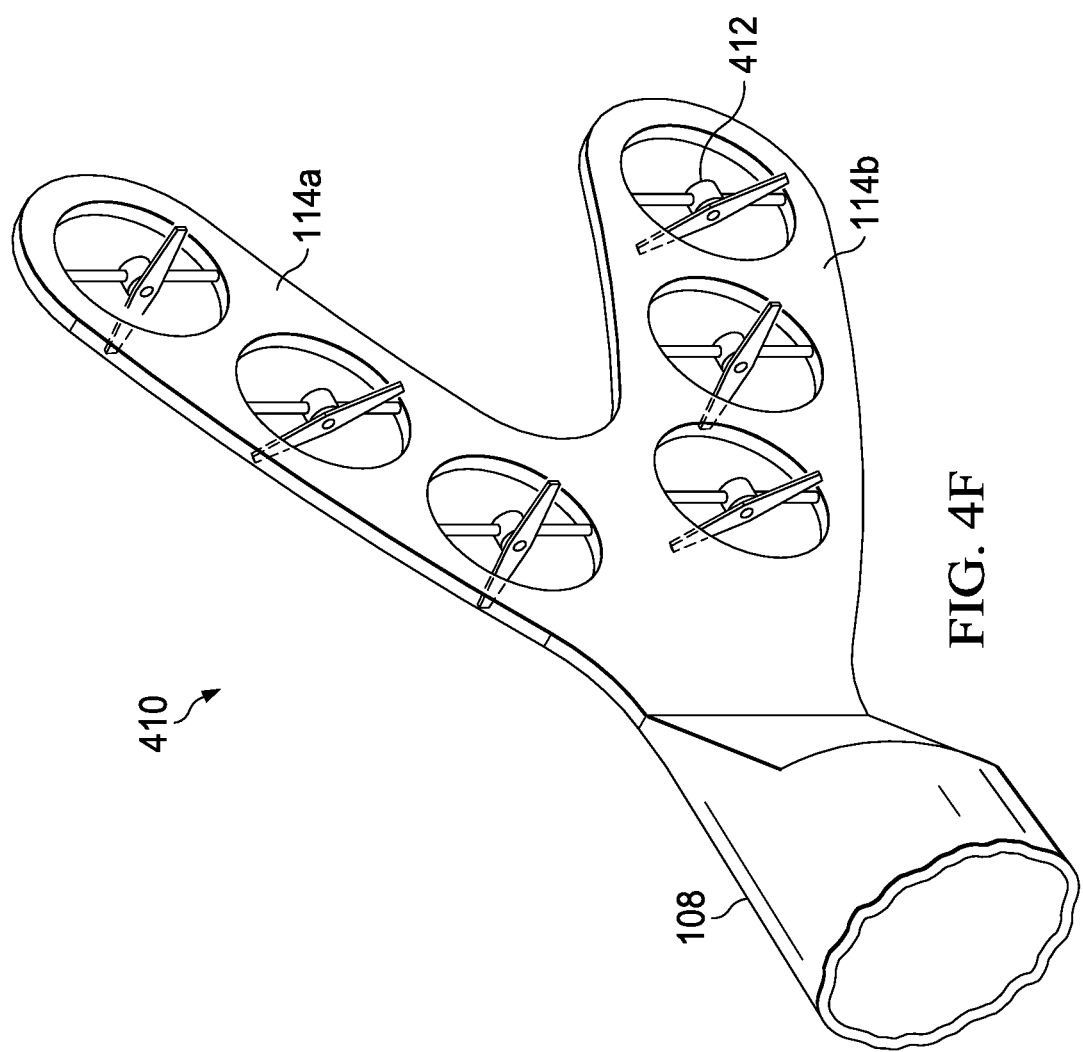

FIGS. 3A to 3F, and 4A to 4F show various schematic diagrams of anti-torque matrix with the tail boom 108 of the helicopter 100. In FIG. 3A the anti-torque matrix 300 is mounted to the tail boom 108 having a surface 114 and is depicted as having various electric motors and fixed pitch angle blades that are of different sizes and generally forming a triangular shape, with the apex of the triangle facing aft and the anti-torque matrix 110 being generally vertical. FIG. 4A shows the same configuration as in FIG. 3A, in this case the anti-torque matrix 400 is depicted with a pivot 412. FIG. 3B shows an anti-torque matrix 302 is mounted to, or integral with, the tail boom 108 having a surface 114 and is depicted as having a J-shape in which the various electric motors and fixed pitch angle blades have about the same size and are ducted. FIG. 4B shows a same configuration as in FIG. 3B, in this case the anti-torque matrix 402 is depicted with a pivot 412. However, in this configuration the anti-torque matrix 402 shows a combination of in-plane variable speed motors and off-plane variable speed motors, which can also apply to all the configurations shown herein. FIG. 3C shows an anti-torque matrix 304 is mounted to the tail boom 108 having surfaces 114a and 114b and is depicted as having various electric motors and fixed pitch angle blades that are about the same size and generally form a triangular shape with the apex of the triangle facing forward. In FIG. 3C, the anti-torque matrix 304 oriented off-plane with the tail boom 108 of the helicopter 100, that is, the anti-torque matrix 304 has been rotated on a Z-axis that passes between the upper end axis 114a and the lower end axis 114b perpendicular from an in-plane orientation. In some implementations, the anti-torque matrix 304 can be pivoted on a horizontal X-axis to provide yaw control of the helicopter 100. FIG. 4C shows the same configuration as in FIG. 3C, in this case the anti-torque matrix 404 is depicted with a pivot 412. FIG. 3D shows an anti-torque matrix 306 is mounted to the tail boom 108 having surfaces 114a and 114b and is depicted as having various electric motors and fixed pitch angle blades that are about the same size and generally form a triangular shape with the apex of the triangle facing forward, however, in this embodiment the fork is horizontal. FIG. 4D shows the same configuration as in FIG. 3D, in this case the anti-torque matrix 406 is depicted with a pivot 412. FIG. 3E shows an anti-torque matrix 308 is mounted to the tail boom 108 having a surface 114 and is depicted as having various electric motors and fixed pitch angle blades that are about the same size and generally form an X-shape, with two additional motors. FIG. 4E shows the same configuration as in FIG. 3E, in this case the anti-torque matrix 408 is depicted with a pivot 412. FIG. 3F shows an anti-torque matrix 310 is mounted to the tail boom 108 having surfaces 114a and 114b and is depicted as having various electric motors and fixed pitch angle blades that are about the same size and generally form a crescent shape with the apex of the crescent facing forward. FIG. 4F shows the same configuration as in FIG. 3F, in this case the anti-torque matrix 410 is depicted with a pivot 412.

FIGS. 4A to 4F shows that a pivoting mechanism can be included with one or more of the fixed pitch rotors in the anti-torque matrix 400-410 at the end of the tail boom 108 of the helicopter 100. In some implementations, the pivoting mechanism can be electric, or can even be a bell crank system and can include a pulley cable system connected to the bell crank system. The pivoting mechanism can be controlled by an operator of the helicopter 100 to orient the anti-torque matrix 400-410 substantially in-plane with the tail boom 108 of the helicopter 100 during a first mode of helicopter operation, and to orient the anti-torque matrix 400-410 substantially off-plane with the tail boom 108 of the helicopter 100 during a second mode of helicopter operation that is different from the first mode. In a fly-by-wire configuration, the pivoting mechanism can be controlled by a logic in a flight control computer that calculates the position of the anti-torque matrix 400-410 during transition to and from the first to the second mode of operation and for independently controlling individual fan speeds to position the matrix for optimum thrust angle, as well as optimum thrust magnitude.

Figure 5B:
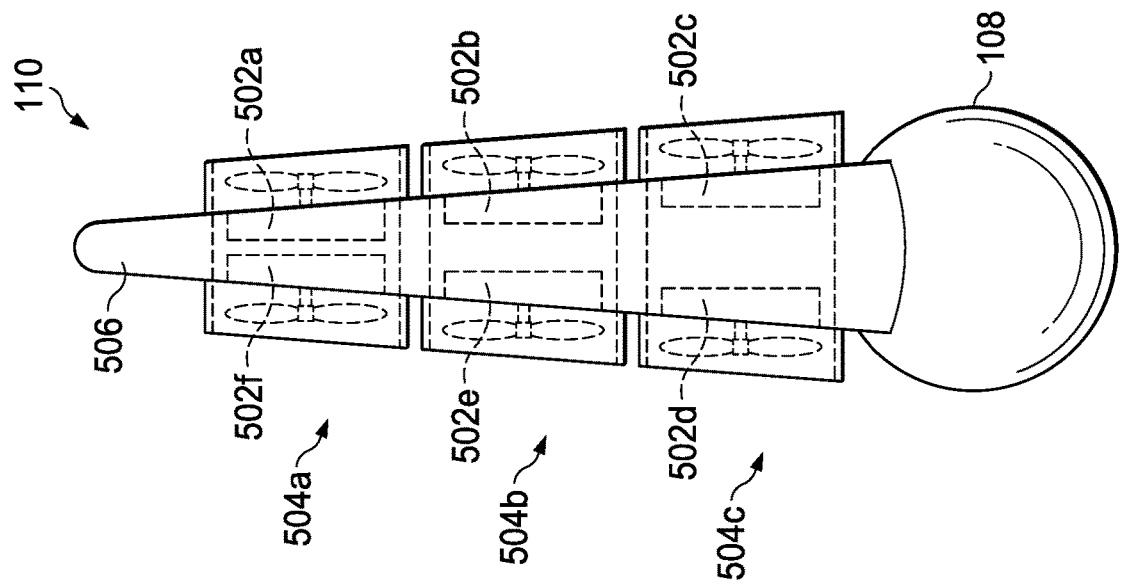
FIGS. 5A and 5B show to variants of co-axially positioned motors with outwardly facing fixed pitch blades of the present invention.
Figure 5A:
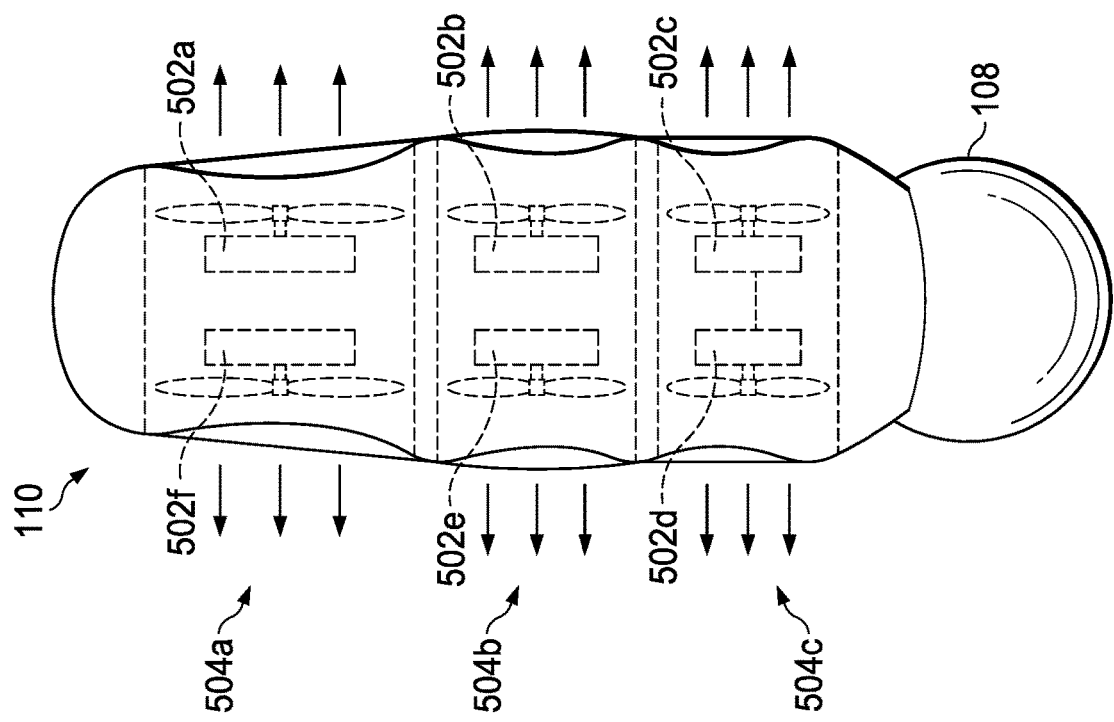

FIG. 5A is an rear, end view of the anti-torque matrix 110 depicted in this version as sitting on the tail boom 108, wherein the anti-torque matrix 110 can be included at the end of the tail boom 108 comprises two parallel sets of variable speed motors and fixed angle blades 502a to 502f, that are shown within the body of the anti-torque matrix 110, wherein the variable speed motors 502a to 502f are co-axial and the blades are outwardly facing. Each pair of coaxial motors (502a and 502f, 502b and 502e, and 502c and 502d) is depicted as being within a duct 504a, 504b, 504c, respectively, and shows three pairs of motors that are internal to the tail boom. The skilled artisan will recognize that if the anti-torque matrix 110 has 6, 9, 12, or other number of pairs of motors, the end view only permits showing, in this version, the closest motors (502a-502f), however, additional pairs of motors and ducts can also be found forward from these motors.

FIG. 5B is an rear, end view of the anti-torque matrix 110 depicted in this version as sitting on the tail boom 108, wherein the anti-torque matrix 110 can be included at the end of the tail boom 108 comprises two parallel sets of variable speed motors and fixed angle blades 502a to 502f, that are shown to extend from the mast 506 of the anti-torque matrix 110, wherein the variable speed motors 502a to 502f are co-axial and the blades are outwardly facing. Each pair of coaxial motors (502a and 502f, 502b and 502e, and 502c and 502d) is depicted as being within a duct 504a, 504b, 504c, respectively, and shows three pairs of motors. The skilled artisan will recognize that if the anti-torque matrix 110 has 6, 9, 12, or other number of pairs of motors, the end view only permits showing, in this version, the closest motors (502a-502f), however, additional pairs of motors and ducts can also be found forward from these motors.

Figure 6B:
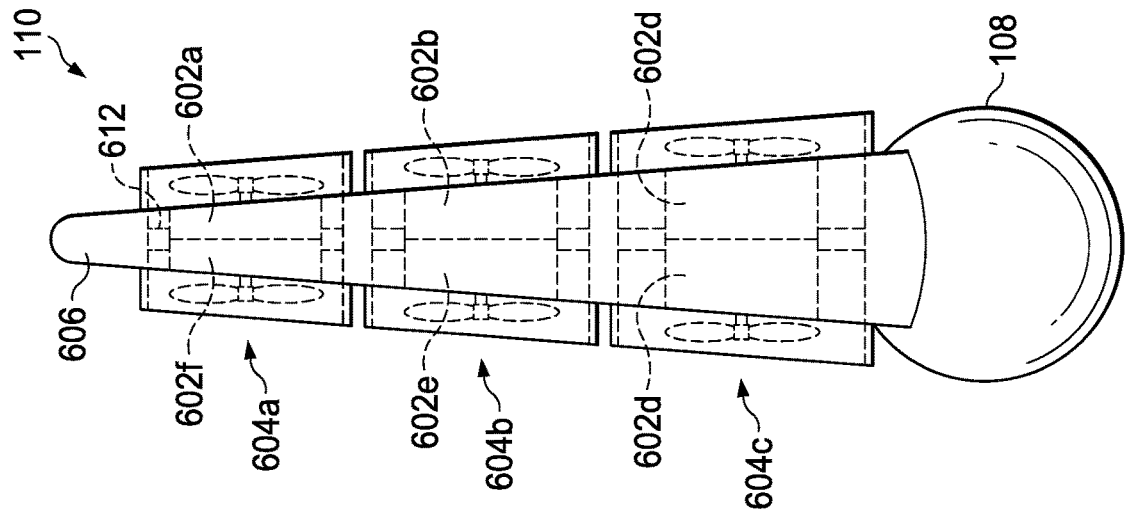
FIGS. 6A and 6B show to variants of co-axially positioned motors with outwardly facing fixed pitch blades of the present invention.
Figure 6A:
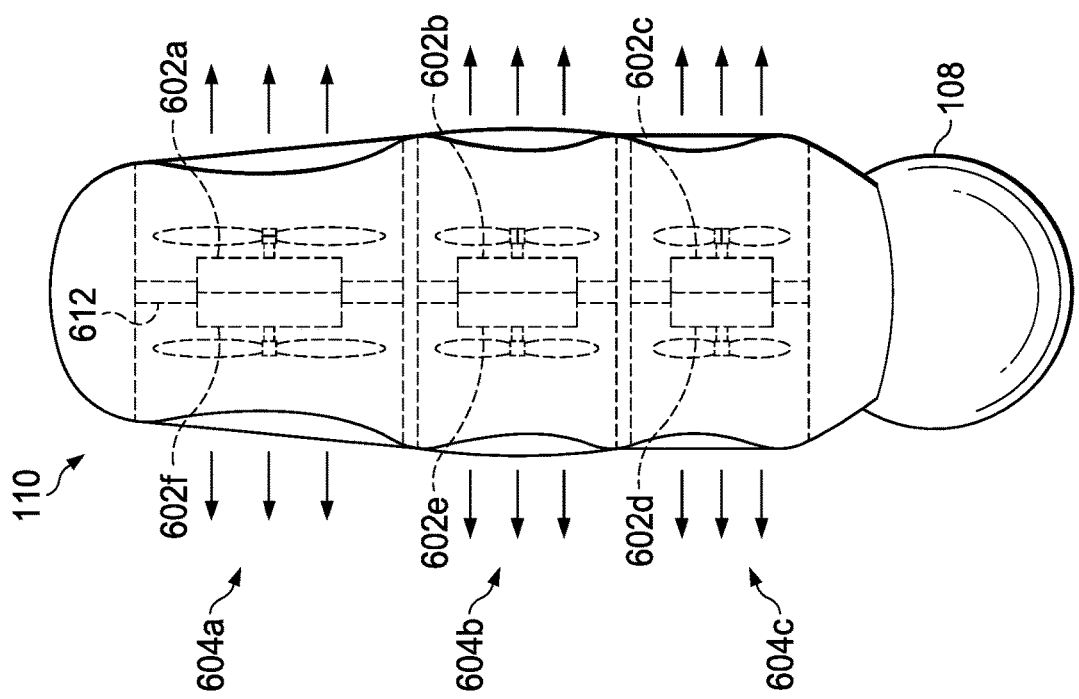

FIGS. 6A and 6B show the same configuration as FIGS. 5A and 5B, but in this configuration the motors 602a-602f are connected to a pivoting mechanism 612. The pivoting mechanism 612 can be electric, mechanical, or can even be a bell crank system and can include a pulley cable system connected to the bell crank system. In the configurations shown in FIGS. 6A and 6B, the aft portion of the anti-torque matrix 110 is fitted with rearward grooves or openings in the aft portion of the tail rotor, for example, at mast 606, to add thrust to the rotorcraft. The pivoting mechanism can be controlled by an operator of the helicopter 100 to orient the anti-torque matrix 110 substantially in-plane with the tail boom 108 of the helicopter 100 during a first mode of helicopter operation, and to orient the anti-torque matrix 110 substantially off-plane with the tail boom 108 of the helicopter 100 during a second mode of helicopter operation that is different from the first mode. In a fly-by-wire configuration, the pivoting mechanism can be controlled by a logic in a flight control computer that calculates the position of the anti-torque matrix 110 during transition to and from the first to the second mode of operation and for independently controlling individual fan speeds to position the matrix for optimum thrust angle, as well as optimum thrust magnitude.

Figure 7:
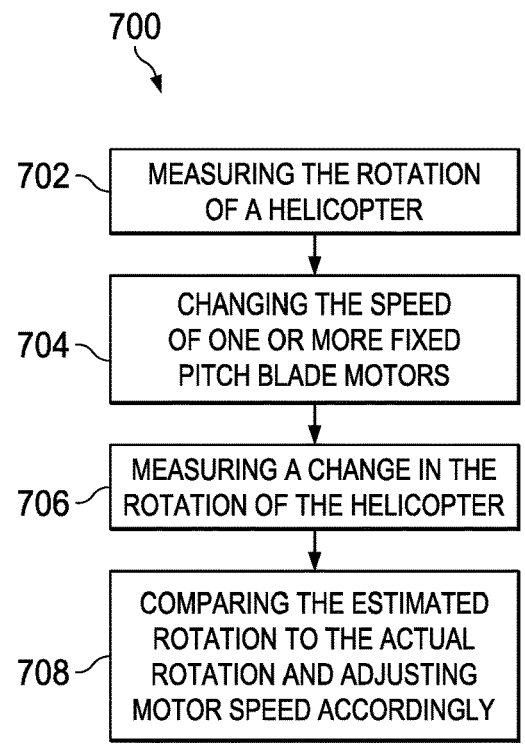
FIG. 7 shows a flowchart of control logic for controlling the rotation of a helicopter that comprises the variable speed motors and fixed angle blades in a matrix pattern.

FIG. 7 shows a flowchart of a control logic 700 for controlling the rotation of a helicopter that comprises the variable speed motors and fixed angle blades in a matrix pattern. In step 702, the control logic 700 that can be, e.g., in a flight control computer, receives measurements of the rotation of the helicopter from, e.g., a rotation sensor. In step 704, the control logic 700 changes the speed of the one or more variable speed motors to increase torque or anti-torque to a desired rotation, which rotation can include no rotation. The control logic 700 can include looking up a table of known or estimated torque calculations or formulas for each of the variable speed motors depending on the size of the motor, fixed pitch blade, or position in the matrix. The position of the variable speed motors in the matrix will significantly affect their individual effect on the rotation of the helicopter. For example, assuming all the variable speed motors and fixed pitch blades are of equivalent size and power, then the variable speed motors and fixed pitch blades that are at the aft-most position will have the greatest effect on torque, while variable speed motors and fixed pitch blades that are fore from other motors will have less overall torque, assuming the same speed. As such, the control logic 700 can look-up the estimated or measured effect on torque for each individual motor (or pairs of motors if co-axial), and then increase or decrease the speed to adjust the rotation of the helicopter. In step 706, the control logic 700 receives data from the rotation sensor that reflects actual helicopter rotation and in step 708, compares the estimate or calculated rotation of the helicopter versus actual rotation and can then adjust motor speed to change the speed of one or more of the variable speed motors and fixed pitch blades to control rotation, if any.

Figure 8:
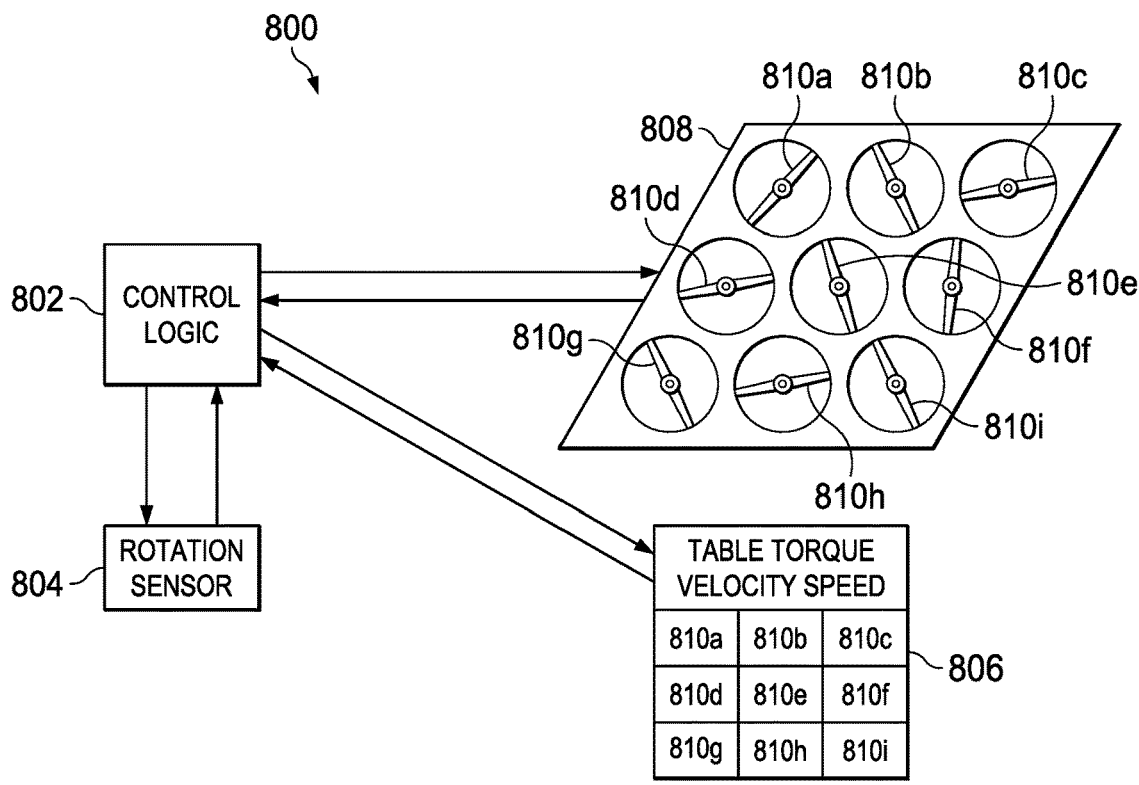
FIG. 8 shows a rotation control system for use with the plurality of variable speed motors arranged in a first or a first and a second matrix.

FIG. 8 shows a rotation control system 800 for use with the plurality of variable speed motors arranged in a first or a first and a second matrix. A control logic 802 is connected to a rotation sensor 804. The control logic 802 is also connected and controls the speed of the one or more fixed pitch blade variable speed motors 810a-810i that are part of anti-torque module 808. The control logic 802 is also connected to a table 806 that includes the calculated torque versus speed for each of the one or more fixed pitch blade variable speed motors 810a-810i. The control logic 802 looks up estimated torques for the motors to adjust the speed of the motors based on a user-input for overall helicopter rotation (if any), then measures actual rotation, and finally adjusts the speed and torque of the one or more fixed pitch blade variable speed motors 810a-810i during flight operations.

Figure 9:
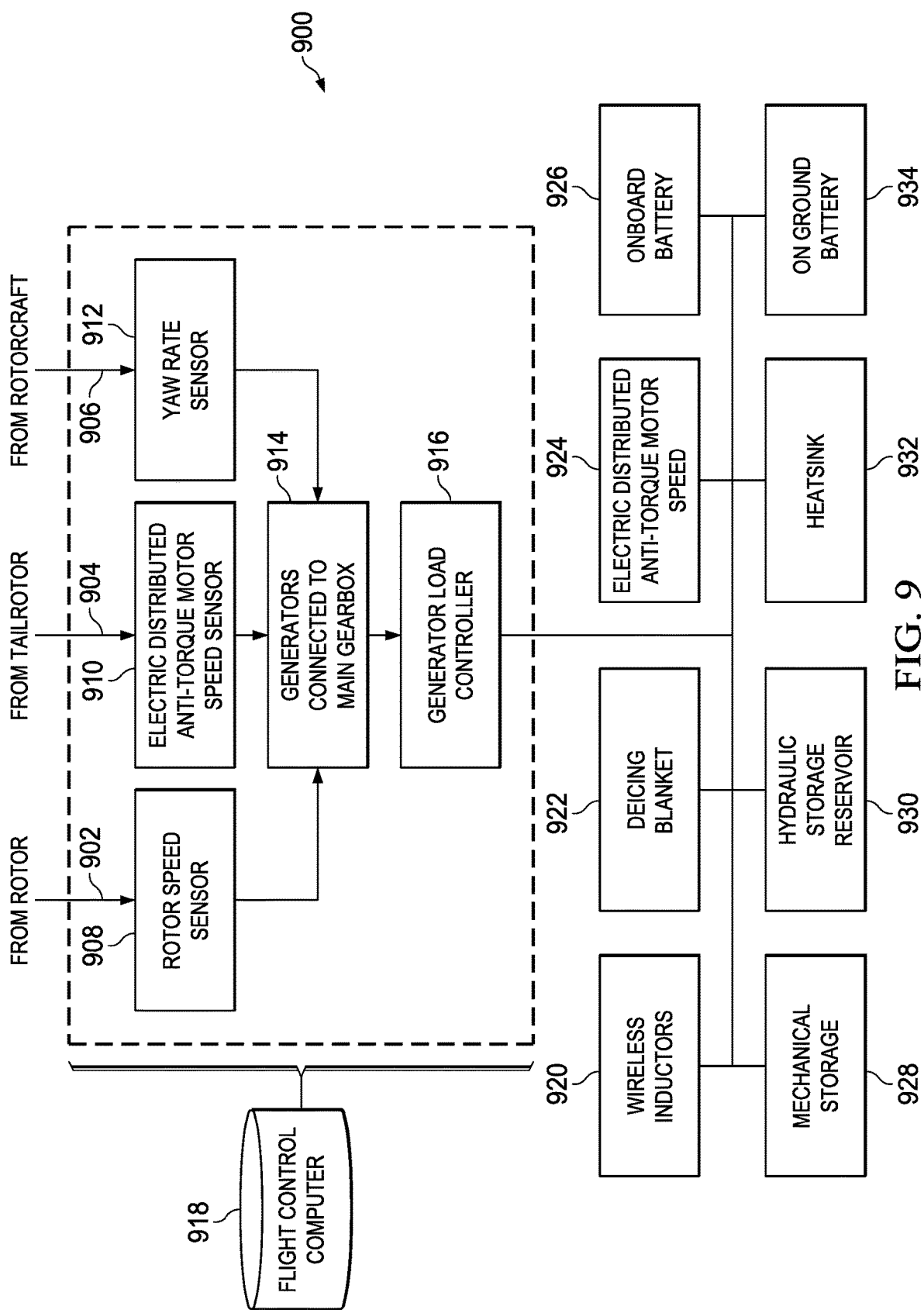
FIG. 9 shows a rotor brake control system according to one example embodiment of the present invention, which can work in cooperation with a mechanical rotor brake system.

FIG. 9 shows a rotor brake control system 900 according to one example embodiment of the present invention, which can work in cooperation with a mechanical rotor brake system (not depicted). In the example of FIG. 9, the rotor brake control system 900 includes input from the rotor 902, input from tail rotor 904, and input from the rotorcraft 906 with regard to the status of the rotation of the rotor, the status of the motors in the tail rotor and their relative speed and thrust, and the status of the location and position of the rotorcraft in relation to the ground. The input is measured by a rotor speed sensor 908, an electric distributed anti-torque motor speed sensor(s) 910, and a yaw rate sensor 912. The output from the sensors (908, 910, 912) is used to control the mechanical load placed on the generators connected to the main gear box or transmission 914, wherein the rotor is slowed by increasing the demand on the generators, wherein the generators produce more electrical power that must be bled off via the generator load controller 916. All of these various sensors and controllers can be connected to the main flight control computer 918, or other computers or processors. In exchange for increased electrical load from the generators, the generators in turn help to slow the main rotor gearbox, which then slows the main rotor. The present invention decreases the speed of the rotor prior to engagement of the mechanical rotor brake, thus reducing wear and tear on the rotor brake. By decreasing the mechanical load on the rotor brake, the rotor brake can be, e.g., reduced in size and weight, have a longer useful life, experience reduced heating (thus increasing flight turnaround time by requiring less time to cool down).

The increase in the generator load at controller 916, electrically connects the generators to one or more systems that require electrical power and that help dissipate the mechanical power of the main rotor during rotor slow down, thus increasing the speed with which the rotation of the main rotor is reduced. Non-limiting examples of the power systems that can be used to bleed off the electricity generated by the generators include: wireless inductors 920 (which can be on the rotorcraft or on the ground), the deicing blanket 922, the electric distributed anti-torque system 924, an onboard battery 926, mechanical storage 928 (such as springs or windings), a hydraulic storage reservoir 930, a heatsink 932, or even an on-ground battery 934 that is connected to the rotorcraft.

Turning to the electric distributed anti-torque system 924, the electric motors of the electric distributed anti-torque system 924 will generally operate to minimize or eliminate any side load on the tail boom. Specifically, the speed of the motors and/or the pitch of the tail rotor blades can be changed to increase lateral thrust in generally opposing directions (taking into consideration the regular need for anti-torque thrust during flight operations). Once the rotorcraft is on the ground, the electrical power can be bled off using the two or more electrical motors in the tail rotor operating in opposing direction to minimize or eliminate any significant side load on the tail boom. The present invention contemplates that some side load is possible, however, any side load should be controlled and/or minimized to as not affect the mechanical integrity of the tail boom.

A number of implementations have been described. Nevertheless, it will be understood that various modifications may be made without departing from the spirit and scope of the disclosure. In some implementations, the fixed or variable blade pitch electric motor module can be controlled by pilot inputs in combination with the operating status of the air vehicle (e.g., hover, transition or forward flight). In implementations in which the rotorcraft is operated using some form of fly-by-wire or fly-by-light control systems, the fixed or variable blade pitch electric motor module operation can be controlled by the computer system, which, in turn, can get cues from the pilot's inputs, etc.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A rotor brake system for a main rotor of a rotorcraft comprising:
   one or more generators connected to a main rotor gearbox, wherein the main rotor gearbox is connected to the main rotor;
   an electric distributed anti-torque system mounted on a tail boom of the rotorcraft and electrically connected to the one or more generators, wherein the electric distributed anti-torque system comprises two or more electric motors and each of the two or more electric motors is directly connected to one or more blades such that each of the one or more blades can operate independently; and wherein a rotation of the main rotor is slowed by placing a drive load on the main rotor gearbox with the one or more generators to convert mechanical power from the main rotor into electrical power, and wherein the electrical power is dispersed by using at least one of the two or more electric motors to generate thrust in one direction and at least another of the two or more electric motors to generates thrust in an opposing direction.

2. The system of claim 1, further comprising a flight control computer that controls an amount of electrical power generated from the one or more generators and directed to each of the two or more electric motors that minimizes or eliminates a side load on the tail boom.

3. The system of claim 1, wherein the two or more electric motors are least one of: a self-commutated motor, an externally commutated motor, a brushed motor, a brushless motor, a linear motor, an AC/DC synchronized motor, an electronic commutated motor, a mechanical commutator motor (AC or DC), an asynchronous motor (AC or DC), a pancake motor, a three-phase motor, an induction motor, an electrically excited DC motor, a permanent magnet DC motor, a switched reluctance motor, an interior permanent magnet synchronous motor, a permanent magnet synchronous motor, a surface permanent magnet synchronous motor, a squirrel-cage induction motor, a switched reluctance motor, a synchronous reluctance motor, a variable-frequency drive motor, a wound-rotor induction motor, an ironless or coreless rotor motor, or a wound-rotor synchronous motor.

4. The system of claim 1, wherein the electric distributed anti-torque system is defined further as comprising 2, 3, 4, 5, 6, 7, 8, 9, 10, 11, 12, 13, 14, 15, or more electric motors.

5. The system of claim 1, wherein the two or more electric motors are at least one of: turned on or off independently, turned on or off as a group, turned on or off in pairs, turned on and off in pulses, or each motor can operate independently to direct thrust in a same or a different direction, wherein an overall thrust generated by the two or more electric motors fails to provide a significant side load on the tail boom.

6. The system of claim 1, wherein additional electrical power is bled from the one or more generators by at least one of: operating an air-conditioning and a heater simultaneously, charging a battery on the rotorcraft or on the ground, or an inductive transfer of electrical power.

7. The system of claim 1, wherein additional electrical power is bled from the one or more generators by converting electrical power into heat via a heat sink, deicing blankets, compressing a gas or liquid in a reservoir.

8. The system of claim 1, wherein the two or more electric motors are a different size, the plurality of blades are a different size, the two or more electric motors are individually ducted, or the blades and the two or more electric motors are on a pivot that allows for rotation of the two or more electric motors to minimize loads in any direction and to minimize or eliminate a side load on the tail boom.

9. The system of claim 1, further comprising a control logic in a flight control computer that calculates the overall torque generated by the electric distributed anti-torque system to reduce or eliminate torque and reduce the speed of the main rotor prior to applying a mechanical rotor brake.

10. The system of claim 1, wherein the one or more blades are fixed-pitch blades, variable-pitch blades, or a combination thereof.

11. A rotor brake system for a rotor of a rotorcraft comprising:

one or more generators connected to a main rotor gearbox;

an electric distributed anti-torque system mounted on a tail boom of the rotorcraft that comprises two or more variable speed electric motors connected to the one or more generators, wherein each of the two or more variable speed electric motors are directly connected to one or more blades such that each of the one or more blades can operate independently and provide anti-torque thrust;

wherein a rotation of the rotor is slowed by placing a drive load on the main rotor gearbox with the one or more generators to bleed the mechanical power from the rotor into electrical power via the two or more variable speed electric motors, wherein at least one of the two or more variable speed electric motors generate thrust in one direction and at least another of the two or more variable speed electric motors to generates thrust in an opposing direction; and a mechanical rotor brake.

12. The system of claim 11, further comprising a flight control computer that controls the electrical power generated by the one or more generators and directed to the two or more variable speed electric motors to minimize, reduce, or eliminate a side load on the tail boom.

13. The system of claim 11, further comprising a logic in a flight control computer that controls at least one of: the speed, the direction, or both the speed and direction, of each of the two or more electric motors to minimize, reduce, or eliminate a side load on the tail boom.

14. The system of claim 11, wherein the two or more variable speed electric motors is at least one of: a self-commutated motor, an externally commutated motor, a brushed motor, a brushless motor, a linear motor, an AC/DC synchronized motor, an electronic commutated motor, a mechanical commutator motor (AC or DC), an asynchronous motor (AC or DC), a pancake motor, a three-phase motor, an induction motor, an electrically excited DC motor, a permanent magnet DC motor, a switched reluctance motor, an interior permanent magnet synchronous motor, a permanent magnet synchronous motor, a surface permanent magnet synchronous motor, a squirrel-cage induction motor, a switched reluctance motor, a synchronous reluctance motor, a variable-frequency drive motor, a wound-rotor induction motor, an ironless or coreless rotor motor, or a wound-rotor synchronous motor.

15. The system of claim 11, wherein additional electrical power is bled from the one or more generators by at least one of: operating both an air-conditioning and a heater simultaneously, charging a battery on the rotorcraft or on the ground, or inductive transfer.

16. The system of claim 11, wherein additional electrical power is bled from the one or more generators by converting electrical power into heat via a heat sink, deicing blankets, compressing a gas or liquid in a reservoir.

17. The system of claim 11, wherein the two or more variable speed electric motors are a different size, the plurality of blades are a different size, the two or more variable speed electric motors are individually ducted, or each of the blades and the two or more variable speed electric motors are on a pivot that allows for rotation of each of the two or more variable speed electric motors to minimize loads in any direction.

18. The system of claim 11, further comprising a control logic in a flight control computer that calculates the overall torque generated by the two or more variable speed electric motors to reduce or eliminate torque and reduce the speed of the main rotor.

19. The system of claim 11, wherein the one or more blades are fixed-pitch blades, variable-pitch blades, or a combination thereof.

20. A method of operating a rotor brake system for a helicopter, the method comprising:
- providing one or more generators connected to a main rotor gearbox transmission;
- connecting two or more variable speed electric motors mounted on a tail boom of the helicopter, wherein each of the two or more variable speed motors are directly connected to one or more blades such that each of the one or more blades can operate independently and provide anti-torque thrust;
- reducing the rotation of the rotor by placing a drive load on the main rotor gearbox with the one or more generators to convert a mechanical power from the rotor into electrical power; and
- using the electrical power generated by the one or more generators to run at least one of the two or more variable speed electric motors to generate thrust in one direction and at least another of the two or more variable speed electric motors to generate thrust in an opposing direction, wherein the rotation of the rotor is reduced prior to engaging a mechanical rotor brake.

21. The method of claim 20, further comprising a flight control computer that controls the electrical power generated by the one or more generators and directed to the two or more variable speed electric motors to minimize, reduce or eliminate a side load on the tail boom.

22. The method of claim 20, further comprising a logic in a flight control computer for controlling at least one of: the speed, the direction, or both the speed and direction, of each of the two or more electric motors to minimize, reduce, or eliminate a side load on the tail boom.

23. The method of claim 20, wherein the two or more variable speed electric motors is at least one of: a self-commutated motor, an externally commutated motor, a brushed motor, a brushless motor, a linear motor, an AC/DC synchronized motor, an electronic commutated motor, a mechanical commutator motor (AC or DC), an asynchronous motor (AC or DC), a pancake motor, a three-phase motor, an induction motor, an electrically excited DC motor, a permanent magnet DC motor, a switched reluctance motor, an interior permanent magnet synchronous motor, a permanent magnet synchronous motor, a surface permanent magnet synchronous motor, a squirrel-cage induction motor, a switched reluctance motor, a synchronous reluctance motor, a variable-frequency drive motor, a wound-rotor induction motor, an ironless or coreless rotor motor, or a wound-rotor synchronous motor.

24. The method of claim 20, wherein the two or more variable speed electric motors further comprises 1, 2, 3, 4, 5, 6, 7, 8, 9, 10, 11, 12, 13, 14, 15, or more additional electric motors.

25. The method of claim 20, wherein the two or more variable speed electric motors can be at least one of: turned on or off independently, turned on or off as a group, turned one or off in pairs, or each motor can operate independently to direct thrust in a same or a different direction to generate an overall thrust that does not create a significant side load on the tail boom.

26. The method of claim 20, wherein additional electrical power is bled from the one or more generators by at least one of: operating both an air-conditioning and a heater simultaneously, charging a battery on the rotorcraft or on the ground, or inductive transfer.

27. The method of claim 20, wherein additional electrical power is bled from the one or more generators by converting electrical power into heat via a heat sink, deicing blankets, compressing a gas or liquid in a reservoir.

28. The method of claim 20, wherein the two or more variable speed electric motors are a different size, the plurality of blades are a different size, the two or more variable speed electric motors are individually ducted, or each of the blades and the two or more variable speed electric motors are on a pivot that allows for rotation of the individual fixed pitch blades and the variable speed electric motors to minimize loads in any direction.

29. The method of claim 20, further comprising connecting a control logic in a flight control computer to: calculate the overall torque generated by the two or more variable speed electric motors to reduce or eliminate torque and reduce the speed of the main rotor.

30. The method of claim 20, wherein the one or more blades are fixed-pitch blades, variable-pitch blades, or a combination thereof.

31. A helicopter comprising:
- a fuselage, an engine in the fuselage, a transmission connected to the engine, and a main rotor connected to the transmission;
- one or more generators connected to a main rotor gearbox;
- an electric distributed anti-torque system mounted on a tail boom of the rotorcraft comprising two or more electric motors connected to the one or more generators, wherein each of the two or more electric motors are directly connected to one or more blades such that each of the one or more blades can operate independently;
- wherein a rotation of the rotor is slowed by placing a drive load on the main rotor gearbox with the one or more generators to bleed the mechanical power from the rotor into electrical power via at least one of the two or more electric motors that generates thrust in one direction and at least another of the two or more electric motors that generates thrust in an opposing direction; and
- a mechanical rotor brake.

32. The helicopter of claim 31, further comprising providing a flight control computer that controls the electrical power generated from the one or more generators and directed to the two or more electric motors to minimize a side load on the tail boom.

33. The helicopter of claim 31, wherein additional electrical power is bled from the one or more generators by at least one of: operating both an air-conditioning and a heater simultaneously, charging a battery on the rotorcraft or on the ground, or an inductive transfer of electrical power.

34. The helicopter of claim 31, wherein additional electrical power is bled from the one or more generators by converting electrical power into heat via a heat sink, deicing blankets, compressing a gas or liquid in a reservoir.

35. The helicopter of claim 31, wherein the one or more blades are fixed-pitch blades, variable-pitch blades, or a combination thereof.

* * * * *